US012705676B2

(12) United States Patent
Li et al.

(10) Patent No.: US 12,705,676 B2
(45) Date of Patent: Aug. 11, 2026

(54) AI-AUGMENTED AUDITING PLATFORM INCLUDING TECHNIQUES FOR AUTOMATED DOCUMENT PROCESSING

(71) Applicant: PwC Product Sales LLC, New York, NY (US)

(72) Inventors: Chung-Sheng Li, Scarsdale, NY (US); Winnie Cheng, West New York, NJ (US); Mark John Flavell, Madison, NJ (US); Lori Marie Hallmark, Xenia, OH (US); Nancy Alayne Lizotte, Saline, MI (US); Anand Srinivasa Rao, Lexington, MA (US); Kevin Ma Leong, Randolph, NJ (US); Di Zhu, Jersey City, NJ (US); Timothy Delille, New York, NY (US); Maria Jesus Perez Ramirez, New York, NY (US); Yuan Wan, Irvine, CA (US); Ratna Raj Singh, Mumbai (IN); Vishakha Bansal, Mumbai (IN); Shaz Hoda, New York, NY (US); Amitoj Singh, New Delhi (IN); Siddhesh Shivaji Zanj, Mumbai (IN)

(73) Assignee: PwC Product Sales LLC, New York, NY (US)

(*) Notice: Subject to any disclaimer, the term of this patent is extended or adjusted under 35 U.S.C. 154(b) by 0 days.

(21) Appl. No.: 19/043,317

(22) Filed: Jan. 31, 2025

(65) Prior Publication Data

US 2025/0182217 A1 Jun. 5, 2025

Related U.S. Application Data

(63) Continuation of application No. 17/854,348, filed on Jun. 30, 2022, now Pat. No. 12,217,318.

(Continued)

(51) Int. Cl.
*G06F 16/00* (2019.01)
*G06F 16/334* (2025.01)
(Continued)

(52) U.S. Cl.
CPC ......... *G06Q 40/12* (2013.12); *G06F 16/3347* (2019.01); *G06F 16/353* (2019.01);
(Continued)

(58) Field of Classification Search
CPC ...... G06F 16/3347; G06F 16/93; G06N 5/022
See application file for complete search history.

(56) References Cited

U.S. PATENT DOCUMENTS

| | | | |
|---|---|---|---|
| 6,564,263 | B1 | 5/2003 | Bergman et al. |
| 6,778,946 | B1 | 8/2004 | Chang et al. |

(Continued)

FOREIGN PATENT DOCUMENTS

| | | | |
|---|---|---|---|
| CA | 3120601 | A1 | 3/2021 |
| CN | 110023970 | A | 7/2019 |

(Continued)

OTHER PUBLICATIONS

Zhu et al., "Signature Detection and Matching for Information Retreival", Nov. 2009, IEEE.pp 2015-2031 (Year: 2009).*

(Continued)

*Primary Examiner* — Alexander Khong
(74) *Attorney, Agent, or Firm* — Morrison & Foerster LLP

(57) ABSTRACT

Systems and methods for automated document processing for use in AI-augmented auditing platforms are provided. A system for determining the composition of document bundles extracts substantive content information and meta-data information from a document bundle and generates, based on the extracted information regarding a composition of the document bundle. A system for validating signatures (Continued)

in documents extracts data representing a spatial location for respective signatures and generates a confidence level for respective signatures, and determines, based on location and confidence level, whether signature criteria are met. A system for extracting information from documents applies a set of data conversion processing steps to a plurality received documents to generate structured data, and then applies a set of knowledge-based modeling processing steps to the structured data to generating output data extracted from the plurality of electronic documents.

33 Claims, 25 Drawing Sheets

Related U.S. Application Data

(60) Provisional application No. 63/217,123, filed on Jun. 30, 2021, provisional application No. 63/217,119, filed on Jun. 30, 2021, provisional application No. 63/217,134, filed on Jun. 30, 2021, provisional application No. 63/217,131, filed on Jun. 30, 2021, provisional application No. 63/217,127, filed on Jun. 30, 2021.

(51) Int. Cl.

| | |
|---|---|
| ***G06F 16/353*** | (2025.01) |
| ***G06F 16/93*** | (2019.01) |
| ***G06N 5/022*** | (2023.01) |
| ***G06N 5/04*** | (2023.01) |
| ***G06N 5/045*** | (2023.01) |
| ***G06Q 10/0635*** | (2023.01) |
| ***G06Q 30/018*** | (2023.01) |
| ***G06Q 40/12*** | (2023.01) |
| ***G06V 30/412*** | (2022.01) |
| ***G06V 30/416*** | (2022.01) |

(52) U.S. Cl.

CPC ............ *G06F 16/93* (2019.01); *G06N 5/022* (2013.01); *G06N 5/041* (2013.01); *G06N 5/045* (2013.01); *G06Q 10/0635* (2013.01); *G06Q 30/018* (2013.01); *G06V 30/412* (2022.01); *G06V 30/416* (2022.01)

(56) References Cited

U.S. PATENT DOCUMENTS

| | | | | |
|---|---|---|---|---|
| 8,857,710 | B1 | 10/2014 | Kowalchyk et al. | |
| 8,930,295 | B2 | 1/2015 | Campbell | |
| 9,053,516 | B2 | 6/2015 | Stempora | |
| 9,483,532 | B1 | 11/2016 | Zhang et al. | |
| 9,710,544 | B1 | 7/2017 | Smith et al. | |
| 9,785,793 | B2 | 10/2017 | Lacey | |
| 10,210,518 | B2 | 2/2019 | Alnajem | |
| 10,303,770 | B2 | 5/2019 | Belov et al. | |
| 10,628,152 | B2 | 4/2020 | Chandramouli et al. | |
| 10,657,530 | B2 | 5/2020 | Smith et al. | |
| 10,896,357 | B1 * | 1/2021 | Corcoran | G06V 30/1916 |
| 10,943,196 | B2 | 3/2021 | Li et al. | |
| 11,315,353 | B1 * | 4/2022 | Cahn | G06V 30/412 |
| 11,361,532 | B1 * | 6/2022 | Martin | G06T 3/40 |
| 11,443,212 | B2 | 9/2022 | Kishimoto et al. | |
| 11,651,039 | B1 * | 5/2023 | Soubbotin | G06F 16/93 707/706 |
| 11,829,332 | B1 * | 11/2023 | Nayar | G06F 16/93 |
| 11,860,950 | B2 * | 1/2024 | Wyle | G06F 16/93 |
| 11,862,305 | B1 * | 1/2024 | Sethi | G06V 30/416 |
| 12,056,771 | B1 * | 8/2024 | Contryman | G06Q 40/08 |
| 2005/0134935 | A1 | 6/2005 | Schmidtler et al. | |
| 2009/0276370 | A1 | 11/2009 | Olson et al. | |
| 2010/0114628 | A1 | 5/2010 | Adler et al. | |
| 2010/0114629 | A1 | 5/2010 | Adler et al. | |
| 2011/0219035 | A1 | 9/2011 | Korsunsky | |
| 2014/0173411 | A1 * | 6/2014 | Sekharan | G06F 40/154 715/234 |
| 2015/0363405 | A1 * | 12/2015 | Biswas | G06F 16/176 707/723 |
| 2016/0321278 | A1 * | 11/2016 | Naqvi | G06Q 30/06 |
| 2017/0018034 | A1 | 1/2017 | Wainman et al. | |
| 2017/0357631 | A1 | 12/2017 | Desai et al. | |
| 2017/0359362 | A1 * | 12/2017 | Kashi | H04L 51/212 |
| 2018/0315141 | A1 * | 11/2018 | Hunn | G06F 9/547 |
| 2018/0336404 | A1 * | 11/2018 | Hosabettu | G06V 30/414 |
| 2019/0156428 | A1 | 5/2019 | Ghatage et al. | |
| 2019/0171944 | A1 | 6/2019 | Lu | |
| 2019/0385704 | A1 | 12/2019 | Oster | |
| 2020/0034842 | A1 | 1/2020 | Ponniah | |
| 2020/0067969 | A1 * | 2/2020 | Abbaszadeh | G06N 3/0499 |
| 2020/0074169 | A1 | 3/2020 | Mukhopadhyay et al. | |
| 2020/0097717 | A1 | 3/2020 | Young et al. | |
| 2020/0184278 | A1 | 6/2020 | Zadeh et al. | |
| 2020/0210817 | A1 | 7/2020 | Chatterjee et al. | |
| 2021/0012103 | A1 * | 1/2021 | Bassu | G06F 16/288 |
| 2021/0081819 | A1 | 3/2021 | Polleri et al. | |
| 2021/0104234 | A1 | 4/2021 | Zhang et al. | |
| 2021/0142169 | A1 | 5/2021 | De et al. | |
| 2021/0173905 | A1 | 6/2021 | Kursun | |
| 2021/0248514 | A1 | 8/2021 | Cella | |
| 2022/0097228 | A1 | 3/2022 | Schaefer et al. | |
| 2022/0171967 | A1 * | 6/2022 | Reisswig | G06V 30/414 |
| 2022/0222049 | A1 | 7/2022 | Lin et al. | |
| 2022/0301072 | A1 * | 9/2022 | Wang | G06N 3/0442 |
| 2022/0405623 | A1 | 12/2022 | Cheng et al. | |
| 2023/0004590 | A1 | 1/2023 | Li et al. | |
| 2023/0004845 | A1 | 1/2023 | Li et al. | |
| 2023/0004888 | A1 | 1/2023 | Li et al. | |
| 2023/0005075 | A1 | 1/2023 | Li et al. | |
| 2024/0305461 | A1 | 9/2024 | Li et al. | |
| 2024/0330323 | A1 | 10/2024 | Li et al. | |
| 2024/0331056 | A1 | 10/2024 | Li et al. | |
| 2024/0346418 | A1 | 10/2024 | Li et al. | |
| 2025/0209092 | A1 | 6/2025 | Li et al. | |

FOREIGN PATENT DOCUMENTS

| | | | | |
|---|---|---|---|---|
| CN | 115496058 | A * | 12/2022 | G06F 40/295 |
| CN | 113518962 | B | 11/2024 | |
| EP | 3709222 | A1 | 9/2020 | |
| WO | 2016/183229 | A1 | 11/2016 | |
| WO | 2019/060468 | A1 | 3/2019 | |
| WO | 2020/212940 | A1 | 10/2020 | |
| WO | 2021/096571 | A1 | 5/2021 | |

OTHER PUBLICATIONS

Adak et al. (Jun. 2022). "Placing (Historical) Facts on a Timeline: A Classification cum Coref Resolution Approach," doi:arXiv:2206.14089v1; 22 pages.

Amplayo et al. (Jun. 2018). "Translations as Additional Contexts for Sentence Classification," doi:arXiv:1806.05516v1; 7 pages.

Beltagy et al. (Sep. 2019). "SciBert: A Pretrained Language Model for Scientific Text," doi:arXiv:1903.10676v3; 6 pages.

Bhattacharjee et al. (Jan. 2021). "BanglaBERT: Combating Embedding Barrier for Low-Resource Language Understanding," doi:arXiv:2101.00204v1; 9 pages.

Bhattacharjee et al. (May 2022). "BanglaBERT: Language Model Pretraining and Benchmarks for Low-Resource Language Understanding Evaluation in Bangla," doi:arXiv:2101.00204v4; 10 pages.

Brack et al. (Feb. 2021). "Sequential Sentence Classification in Research Papers Using Cross-Domain Multi-Task Learning," doi:arXiv:2102.06008v1; 34 pages.

Brack et al. (Mar. 2022). "Cross-Domain Multi-Task Learning for Sequential Sentence Classification in Research Papers," doi: arXiv:2102.06008v2; 13 pages.

Brown. (May 2023) "What is an Array in Math?," located at https://www.learner.com/blog/what-is-an-array-in-math. (6 pages).

(56) References Cited

OTHER PUBLICATIONS

Burdisso et al. (Jul. 2020). "PySS3: A Python Package Implementing a Novel Text Classifier with Visualization Tools for Explainable AI," doi:arXiv:1912.09322v2; 7 pages.
Burdisso et al. (May 2020). "T-SS3: A Text Classifier with Dynamic n-Grams for Early Risk Detection Over Text Streams," doi: arXiv:1911.06147v2; 9 pages.
Castelli et al., (Jun. 2003). "CSVD: Clustering and Singular Value Decomposition for Approximate Similarity Search in High-Dimensional Spaces," IEEE Transactions on Knowledge and Data Engineering 15(3): 671-685.
Chang et al. (Jun. 2020). "Taming Pretrained Transformers for Extreme Multi-Label Text Classification," doi: arXiv:1905.02331v4; 9 pages.
Chen et al. (Oct. 2021). "Revisiting Self-Training for Few-Shot Learning of Language Model," doi: arXiv:2110.01256v1; 11 pages.
Chi et al. (Apr. 2021). "mT6: Multilingual Pretrained Text-to-Text Transformer with Translation Pairs," doi: arXiv:2104.08692v1; 12 pages.
Chi et al. (Sep. 2021). "mT6: Multilingual Pretrained Text-to-Text Transformer with Translation Pairs," doi: arXiv:2104.08692v2; 13 pages.
Cho et al. (Sep. 2019). "Investigating an Effective Character-Level Embedding in Korean Sentence Classification," doi:arXiv:1905.13656v3; 9 pages.
Cohan et al. (Sep. 2019). "Pretrained Language Models for Sequential Sentence Classification," doi: arXiv:1909.04054v2; 7 pages.
Cohan et al. (Sep. 2019). "Structural Scaffolds for Citation Intent Classification in Scientific Publications," doi: arXiv:1904.01608v2; 11 pages.
Conneau et al. (Jul. 2018). "What You Can Cram Into a Single $&!#* Vector: Probing Sentence Embeddings for Linguistic Properties," doi:arXiv:1805.01070v2; 14 pages.
Croce et al. "GAN-BERT: Generative Adversarial Learning for Robust Text Classification with a Bunch of Labeled Examples," Proceedings of the 58th Annual Meeting of the Association for Computational Linguistics, Jul. 5-10, 2020; pp. 2114-2119.
Dai et al. (Jul. 2015). "Document Embedding with Paragraph Vectors," arXiv:1507.07998v1; 8 pages.
de Guevara et al. (Jan. 2021). "Multimodal Word Sense Disambiguation in Creative Practice," doi: arXiv:2007.07758v2; 8 pages.
Dernoncourt et al. (Dec. 2016). "Neural Networks for Joint Sentence Classification in Medical Paper Abstracts," doi:arXiv:1612.05251v1; 6 pages.
Dernoncourt et al. (Oct. 2017). "PubMed 200k RCT: a Dataset for Sequential Sentence Classification in Medical Abstracts," doi:arXiv:1710.06071v1; 6 pages.
Devlin et al. (May 2019). "BERT: Pre-Training of Deep Bidirectional Transformers for Language Understanding," doi: arXiv:1810.04805v2; 16 pages.
Ding et al. (Feb. 2018). "Densely Connected Bidirectional LSTM with Applications to Sentence Classification," doi: arXiv:1802.00889v1; 7 pages.
Extended European Search Report dated Dec. 11, 2024, directed to European Application No. 22834414.9; 8 pages.
Extended European Search Report dated Jan. 22, 2025, directed to EP Application No. 22834412.3; 9 pages.
Fruhlinger. (Feb. 2020). "The CIA Triad: Definition, Components and Examples," located at https://www.csonline.com/article/3519908/the-cia-triad-definition-components-and-examples.html. (7 pages).
Fukukawa et al. (2012). "Auditors' Evidence Evaluation and Aggregation Using Beliefs and Probabilities," located at https://bfasociety.org/Belief2010/html/papers/p50.pdf; (6 pages).
Guo et al. (May 2019). "Augmenting Data with Mixup for Sentence Classification: An Empirical Study," doi: arXiv:1905.08941v1; 7 pages.
Hagiwara. (2019)."Sentence Classification in NLP," Real-World Language Processing, located at https://freecontent.manning.com/sentence-classification-in-nlp/; 12 pages.
Halterman et al. (May 2021). "Corpus-Level Evaluation for Event QA: The IndiaPoliceEvents Corpus Covering the 2002 Gujarat Violence," doi:arXiv:2105.12936v1; 21 pages.
Hirlea et al. (Mar. 2022). "Contextual Sentence Classification: Detecting Sustainability Initiatives in Company Reports," doi:arXiv:2110.03727v2; 12 pages.
International Search Report and Written Opinion mailed Oct. 5, 2022, directed to International Application No. PCT/US2022/073277; 9 pages.
International Search Report and Written Opinion mailed Oct. 5, 2022, directed to International Application No. PCT/US2022/073279; 9 pages.
International Search Report and Written Opinion mailed Sep. 21, 2022, directed to International Application No. PCT/US2022/073280; 9 pages.
International Search Report and Written Opinion mailed Sep. 21, 2022, directed to International Application No. PCT/US2022/073290; 9 pages.
International Search Report and Written Opinion mailed Sep. 21, 2022, directed to International Application No. PCT/US2022/073292; 10 pages.
Jain et al. "Entity at SemEval-2021 Task 5: Weakly Supervised Token Labelling for Toxic Spans Detection," Proceedings of the 15th International Workshop on Semantic Evaluation, Aug. 5-6, 2021, Bangkok, Thailand (online); pp. 935-940.
Jang et al. (Oct. 2018). "Paraphrase Thought: Sentence Embedding Module Imitating Human Language Recognition," doi:arXiv:1808.05505v3; 10 pages.
Jiang et al. (Apr. 2020). "Cross-Lingual Information Retrieval with BERT," doi:arXiv:2004. 13005v1; 6 pages.
Jin et al. (Aug. 2018). "Hierarchical Neural Networks for Sequential Sentence Classification in Medical Scientific Abstracts," doi:arXiv:1808.06161v1; 10 pages.
Jin et al. (Jun. 2020). "Discrete Latent Variable Representations for Low-Resource Text Classification," doi: arXiv:2006.06226v1; 12 pages.
Jung et al. (May 2020). "Posterior Calibrated Training on Sentence Classification Tasks," doi:arXiv:2004.14500v2; 8 pages.
Jurgens et al. (Jun. 2018). "Measuring the Evolution of a Scientific Field Through Citation Frames," Transactions of the Association for Computational Linguistics, vol. 6; pp. 391-406.
Jørgensen et al. (Sep. 2021). "mDAPT: Multilingual Domain Adaptive Pretraining in a Single Model," doi: arXiv:2109.06605v1; 15 pages.
Kim. (Sep. 2014). "Convolutional Neural Networks for Sentence Classification," doi:arXiv:1408.5882v2; 6 pages.
Lange et al. (Oct. 2020). "Adversarial Learning of Feature-based Meta-Embeddings," doi:arXiv:2010.12305v1; 14 pages.
Lange et al. (Oct. 2021). "FAME: Feature-Based Adversarial Meta-Embeddings for Robust Input Representations," doi:arXiv:2010.12305v2; 14 pages.
Lee et al. (Sep. 2019). "BioBERT: A Pre-trained Biomedical Language Representation Model for Biomedical Text Mining," Bioinformatics 2019; pp. 1-7.
Li et al. (Dec. 1999). "Framework for Efficient Processing of Content-Based Fuzzy Cartesian Queries," Storage and Retrieval for Media Databases 2000, International Society for Optics and Photonics, (vol. 3972); pp. 64-75.
Li et al. (Jun. 2015). "A Hierarchical Neural Autoencoder for Paragraphs and Documents," arXiv:1506.01057v2; 10 pages.
Li et al. (May 2021). "Improving BERT with Syntax-aware Local Attention," doi: arXiv:2012.15150v2; 9 pages.
Li et al., U.S. Appl. No. 17/854,329, filed Jun. 30, 2022, for "AI-Augmented Auditing Platform Including Techniques for Automated Assessment of Vouching Evidence." [A copy is not submitted herewith pursuant to the waiver of 37 C.F.R. § 1.98(a)(2)(iii) issued by the Office on Sep. 21, 2004.].
Li et al., U.S. Appl. No. 17/854,337, filed Jun. 30, 2022, for "AI-Augmented Auditing Platform Including Techniques for Automated Adjudication of Commercial Substance, Related Parties, and Collectability." [A copy is not submitted herewith pursuant to the waiver of 37 C.F.R. § 1.98(a)(2)(iii) issued by the Office on Sep. 21, 2004.].

(56) References Cited

OTHER PUBLICATIONS

Li et al., U.S. Appl. No. 17/854,338, filed Jun. 30, 2022, for "AI-Augmented Auditing Platform Including Techniques for Applying a Composable Assurance Integrity Framework." [A copy is not submitted herewith pursuant to the waiver of 37 C.F.R. § 1.98(a)(2)(iii) issued by the Office on Sep. 21, 2004.].
Li et al., U.S. Appl. No. 17/854,352, filed Jun. 30, 2022, for "AI-Augmented Auditing Platform Including Techniques for Providing AI-Explainability for Processing Data Through Multiple Layers." [A copy is not submitted herewith pursuant to the waiver of 37 C.F.R. § 1.98(a)(2)(iii) issued by the Office on Sep. 21, 2004.].
Li et al., U.S. Office Action dated Aug. 28, 2024, directed to U.S. Appl. No. 17/854,337; 38 pages.
Li et al., U.S. Office Action dated Feb. 13, 2025, directed to U.S. Appl. No. 17/854,329; 30 pages .
Li et al., U.S. Office Action dated Feb. 27, 2024, directed to U.S. Appl. No. 17/854,348; 13 pages.
Li et al., U.S. Office Action dated Feb. 4, 2025, directed to U.S. Appl. No. 17/854,352; 29 pages.
Li et al., U.S. Office Action dated Nov. 5, 2024, directed to U.S. Appl. No. 17/854,338; 20 pages.
Li et al., U.S. Office Action dated Sep. 10, 2024, directed to U.S. Appl. No. 17/854,329; 21 pages.
Liu et al. (Aug. 2018). "An Attention-Gated Convolutional Neural Network for Sentence Classification;" 19 pages.
Liu et al. (May 2019). "Multi-Task Deep Neural Networks for Natural Language Understanding," arXiv:1901.11504v2; 10 pages.
Liu et al. (May 2021). "UIUC_BioNLP at SemEval-2021 Task 11: A Cascade of Neural Models for Structuring Scholarly NLP Contributions," doi:arXiv:2105.05435v1; 10 pages.
Liu. (Mar. 2017). "Automatic Argumentative-Zoning Using Word2vec," doi:arXiv:1703.10152v1; 13 pages.
Lorenz et al. (Feb. 2021). "QNLP in Practice: Running Compositional Models of Meaning on a Quantum Computer," doi:arXiv:2102.12846v1; 15 pages.
Madabushi et al. (Mar. 2020). "Cost-Sensitive BERT for Generalisable Sentence Classification with Imbalanced Data," doi:arXiv:2003.11563v1; 10 pages.
Meng et al. (May 2020). "Glyce: Glyph-vectors for Chinese Character Representations," doi:arXiv:1901.10125v5; 12 pages.
Mollá et al. (Aug. 2021). "Query-Focused Extractive Summarisation for Finding Ideal Answers to Biomedical and COVID-19 Questions," doi:arXiv:2108.12189v2; 12 pages.
Montero et al. (Sep. 2021). "Sentence Bottleneck Autoencoders from Transformer Language Models," doi:arXiv:2109.00055v2; 10 pages.
Munkhdalai et al. (Feb. 2017). "Neural Tree Indexers for Text Understanding," doi:arXiv:1607.04492v2; 11 pages.
Munkhdalai et al. (Jan. 2017). "Neural Semantic Encoders," doi:arXiv:1607.04315v3; 12 pages.
Murahari et al. (Feb. 2022). "DataMUX: Data Multiplexing for Neural Networks," doi:arXiv:2202.09318v1; 13 pages.
Namboodiri et al. (2007). "Document Structure and Layout Analysis," located at https://citeseerx.ist.psu.edu/viewdoc/download?doi=10.1.1.884.6373&rep=rep1&type=pdf; (17 pages).
Nangia et al. (Apr. 2018). "ListOps: A Diagnostic Dataset for Latent Tree Learning," doi:arXiv:1804.06028v1; 8 pages.
Natsev et al. (Aug. 2001). "Supporting Incremental Join Queries on Ranked Inputs," VLDB (vol. 1): 281-290.
Nonnenmacher et al. (Jan. 2021). "Unsupervised anomaly detection for internal auditing: Literature review and research agenda," The International Journal of Digital Accounting Research, vol. 21: 1-22.
Norwich University Online. (Jul. 2018). "The 5 Pillars of Information Assurance," located at https://online.norwich.edu/academic-programs/resources/the-5-pillars-of-information-assurance. (7 pages).
Peris et al. (Aug. 2018). "NMT-Keras: a Very Flexible Toolkit with a Focus on Interactive NMT and Online Learning," doi:arXiv:1807.03096v3; 12 pages.
Pham et al. "Convolutional Neural Network Language Models," Proceedings of the 2016 Conference on Empirical Methods in Natural Language Processing, Nov. 1-5, 2016, Austin, Texas; pp. 1153-1162.
Prasanna et al. (Apr. 2019). "Zoho at SemEval-2019 Task 9: Semi-supervised Domain Adaptation Using Tri-training for Suggestion Mining," doi:arXiv:1902.10623v2; 5 pages.
Pömsl et al. (Oct. 2020). "CIRCE at SemEval-2020 Task 1: Ensembling Context-Free and Context-Dependent Word Representations," doi:arXiv:2005.06602v3; 7 pages.
Qian et al. (Mar. 2020). "An Approach for Process Model Extraction by Multi-Grained Text Classification," doi: arXiv.1906.02127v3; 15 pages.
Raunak et al. (May 2020). "On Dimensional Linguistic Properties of the Word Embedding Space," doi: arXiv:1910.02211v2; 10 pages.
Rei et al. (Nov. 2018). "Jointly Learning to Label Sentences and Tokens," doi:arXiv:1811.05949v1; 8 pages.
Ruder et al. (Sep. 2016). "Character-level and Multi-channel Convolutional Neural Networks for Large-scale Authorship Attribution," doi:arXiv:1609.06686v1; 9 pages.
Ruggeri et al. (Sep. 2021). "Tree-Constrained Graph Neural Networks for Argument Mining," doi: arXiv:2110.00124v1; 14 pages.
Russell. (Aug. 2019) "Arrays in Mathematics," located at https://www.thoughtco.com/definition-of-arrays-in-mathematics-2312362, visited on Oct. 23, 2023. (2 pages).
Sanh et al. (Mar. 2020). "DistilBERT, a Distilled Version of BERT: Smaller, Faster, Cheaper and Lighter," arXiv:1910.01108v4; 5 pages.
Schröder et al. (Mar. 2022). "Revisiting Uncertainty-based Query Strategies for Active Learning with Transformers," doi:arXiv:2107.05687v2; 10 pages.
Schumann et al. "Active Learning via Membership Query Synthesis for Semi-supervised Sentence Classification," Proceedings of the 23rd Conference on Computational Natural Language Learning, Nov. 3-4, 2019, Hong Kong, China; pp. 472-481.
Sharma. (Dec. 2021). "Dependency Parsing in Natural Language Processing with Examples," located at https://www.analyticsvidhya.com/blog/2021/12/dependency-parsing-in-natural-language-processing-with-examples/; (8 pages).
Shieh et al. (Oct. 2019). "Towards Understanding of Medical Randomized Controlled Trials by Conclusion Generation," doi:arXiv:1910.01462v1; 10 pages.
Singh et al. (Oct. 2020). "Voice@SRIB at SemEval-2020 Task 9 and 12: Stacked Ensembling method for Sentiment and Offensiveness detection in Social Media," doi:arXiv:2007.10021v3; 11 pages.
Song et al. (Nov. 2019). "Bivariate Beta-LSTM," doi:arXiv:1905.10521v3; 9 pages.
Tutubalina et al. (Apr. 2020). "The Russian Drug Reaction Corpus and Neural Models for Drug Reactions and Effectiveness Detection in User Reviews," doi:arXiv:2004.03659v1; 9 pages.
Vadapalli. (Mar. 2021). Dependency Parsing in NLP [Explained with Examples], located at https://www.upgrad.com/blog/dependency-parsing-in-nlp/; (12 pages).
Veyseh et al. (Apr. 2020). "A Joint Model for Definition Extraction with Syntactic Connection and Semantic Consistency," doi:arXiv:1911.01678v4; 9 pages.
Wang et al. "EANN: Event Adversarial Neural Networks for Multi-Modal Fake News Detection," Proceedings of the 24th ACM SIGKDD International Conference on Knowledge Discovery & Data Mining, Aug. 19-23, 2018, London, United Kingdom; pp. 849-857.
Wang et al. (Sep. 2021). "Counterfactual Adversarial Learning with Representation Interpolation," doi: arXiv:2109.04746v1; 12 pages.
Wei et al. (Jun. 2022). "SynWMD: Syntax-aware Word Mover's Distance for Sentence Similarity Evaluation," doi: arXiv:2206.10029v1; 8 pages.
Wieting et al. (Jan. 2019). "No Training Required: Exploring Random Encoders for Sentence Classification," doi: arXiv:1901.10444v1; 16 pages.
Wilie et al. (Oct. 2020). "IndoNLU: Benchmark and Resources for Evaluating Indonesian Natural Language Understanding," doi:arXiv:2009.05387v3; 15 pages.

(56) References Cited

OTHER PUBLICATIONS

Williams et al. (Feb. 2018). "Do Latent Tree Learning Models Identify Meaningful Structure in Sentences?," doi: arXiv:1709.01121v2; 15 pages.
Xu et al. (Nov. 2020). "CLUE: A Chinese Language Understanding Evaluation Benchmark," doi: arXiv:2004.05986v3; 15 pages.
Yao et al., "UJNLP at SemEval-2020 Task 12: Detecting Offensive Language Using Bidirectional Transformers," Proceedings of the 14th International Workshop on Semantic Evaluation, Dec. 12, 2020, Barcelona, Spain (Online); pp. 2203-2208.
Ye et al. (Aug. 2021). "Understanding Human Reading Comprehension with Brain Signals," doi:arXiv:2108.01360v2; 11 pages.
Zeng et al. (Dec. 2019). "Neural Simile Recognition with Cyclic Multitask Learning and Local Attention," doi: arXiv:1912.09084v1; 8 pages.
Zhang et al. (Apr. 2016). "A Sensitivity Analysis of (and Practitioners' Guide to) Convolutional Neural Networks for Sentence Classification," doi:arXiv:1510.03820v4; 18 pages.
Zhang et al. (Apr. 2018). "Word Embedding Perturbation for Sentence Classification," doi:arXiv:1804.08166v1; 6 pages.
Zhang et al. (Dec. 2016). "Active Discriminative Text Representation Learning," doi:arXiv:1606.04212v4; 8 pages.
Zhang et al. (Jun. 2021). "CBLUE: A Chinese Biomedical Language Understanding Evaluation Benchmark," doi: arXiv:2106.08087v1; 26 pages.
Zhang et al. (Mar. 2022). "CBLUE: A Chinese Biomedical Language Understanding Evaluation Benchmark," doi: arXiv:2106.08087v6; 29 pages.
Extended European Search Report dated Mar. 10, 2025, directed to EP Application No. 22834419.8; 8 pages.
Extended European Search Report dated Mar. 14, 2025, directed to EP Application No. 22834417.2; 9 pages.
Extended European Search Report dated Mar. 5, 2025, directed to EP Application No. 22834413.1; 6 pages.
Li et al., U.S. Office Action dated Feb. 24, 2025, directed to U.S. Appl. No. 17/854,337; 57 pages.
Li et al., U.S. Office Action dated May 28, 2025, directed to U.S. Appl. No. 17/854,338; 28 pages.
Chrisman. (2015) "Deontic Modals," article summary, Routledge Encyclopedia of Philosophy, located at www.rep.routledge.com/articles/thematic/deontic-modals/v-1; 2 pages.
Li et al., U.S. Office Action dated Dec. 15, 2025, directed to U.S. Appl. No. 17/854,352; 18 pages.
Li et al., U.S. Office Action dated Jan. 8, 2026, directed to U.S. Appl. No. 17/854,337; 57 pages.
Li et al., U.S. Office Action dated Aug. 12, 2025, directed to U.S. Appl. No. 17/854,352; 30 pages.
Li et al., U.S. Office Action dated Jul. 31, 2025, directed to U.S. Appl. No. 17/854,329; 35 pages.
Li et al., U.S. Office Action dated Sep. 4, 2025, directed to U.S. Appl. No. 17/854,337; 62 pages.
Li et al., U.S. Office Action dated Feb. 24, 2026, directed to U.S. Appl. No. 17/854,338; 33 pages.

* cited by examiner

| | ABBYY FlexiCapture/AWS Textract | DeepOCR |
|---|---|---|
| **Location Inference** | 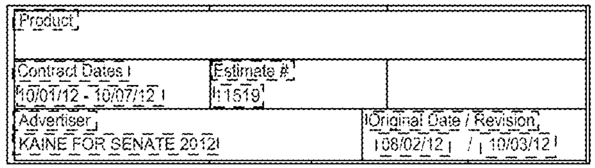 | 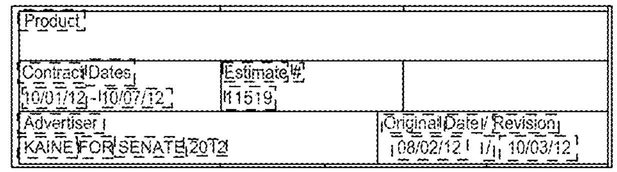 |
| **Content Inference** | · Product<br>· Contract Dates<br>· Estimate<br>· 10/01/12-10/07/12<br>· Advertiser<br>· KAINE FOR SENATE 2012<br>· ..... | · Product<br>· Contract<br>· Dates<br>· 10/01/12<br>· 10/07/12<br>· Estimate#<br>· Advertiser<br>· KAINE<br>· FOR<br>· SEENATE<br>· 2012<br>· ..... |
FIG. 7

| | slug | page | x0 | y0 | x1 | y1 | rel_x0 | rel_y0 | rel_x1 | rel_y1 | token | line_label | word_group_label |
|---|---|---|---|---|---|---|---|---|---|---|---|---|---|
| 0 | 434292-collect-files-47904-political-file-2012... | 1 | 48.0 | 51.0 | 254.0 | 79.0 | 0.028235 | 0.023171 | 0.149412 | 0.035893 | Contract | 0 | 434292-collect-files-47904-political-file-2012... |
| 1 | 434292-collect-files-47904-political-file-2012... | 1 | 254.0 | 51.0 | 350.0 | 75.0 | 0.149412 | 0.023171 | 0.205882 | 0.034075 | Between | 0 | 434292-collect-files-47904-political-file-2012... |
| 2 | 434292-collect-files-47904-political-file-2012... | 1 | 1183.0 | 51.0 | 1234.0 | 75.0 | 0.695882 | 0.023171 | 0.725882 | 0.034075 | Print | 0 | 434292-collect-files-47904-political-file-2012... |

FIG. 19

| Token | Label |
|---|---|
| For | Y |
| instance | N |
| the | N |
| JONES | Y |
| FOR | Y |
| SENATE | Y |
| is | N |
| a | N |
| committee | N |
| name | N |

FIG. 20

| OCEQUERA/CON/DEM |
|---|

FIG. 21

| TYPE | DESCRIPTION |
| --- | --- |
| PERSON | People, including fictional. |
| NORP | Nationalities or religious or political groups. |
| FAC | Buildings, airports, highways, bridges, etc. |
| ORG | Companies, agencies, institutions, etc. |
| GPE | Countires, cities, states. |
| LOC | Non-GPE locations, mountain ranges, bodies of water. |
| PRODUCT | Objects, vehicles, foods, etc. (Not services.) |
| EVENT | Named hurricanes, battles, wars, sports events, etc. |
| WORK_OF_ART | Titles of books, songs, etc. |
| LAW | Named documents made into laws. |
| LANGUAGE | Any named language. |
| DATE | Absolute or relative dates or periods. |
| TIME | Times smaller than a day. |
| PERCENT | Percentage, including "%". |
| MONEY | Monetary values, including unit. |
| QUANTITY | Measurements, as of weight or distance. |
| ORDINAL | "first", "second", etc. |
| CARDINAL | Numerals that do not fall under another type. |

FIG. 23

AI-AUGMENTED AUDITING PLATFORM INCLUDING TECHNIQUES FOR AUTOMATED DOCUMENT PROCESSING

CROSS-REFERENCE TO RELATED APPLICATION(S)

This application is a continuation of U.S. application Ser. No. 17/854,348, filed Jun. 30, 2022, which claims the benefit of U.S. Provisional Application No. 63/217,119, filed Jun. 30, 2021; U.S. Provisional Application No. 63/217,123, filed Jun. 30, 2021; U.S. Provisional Application No. 63/217,127, filed Jun. 30, 2021; U.S. Provisional Application No. 63/217,131, filed Jun. 30, 2021; and U.S. Provisional Application No. 63/217,134, filed Jun. 30, 2021, the entire contents of each of which are incorporated herein by reference.

FIELD

This relates generally to document processing, and more specifically to AI-augmented auditing platform including techniques for automated document processing.

BACKGROUND

AI-augmented auditing platforms benefit from automated document processing techniques including automated document classification and clustering, automated signature detection and validation, and automated information extraction from PDF documents and other document formats.

SUMMARY

Known techniques for document classification do not adequately leverage context data to guide document classification, especially in the context of audit processes. As described herein, context data that is available in audit processes may be effectively and efficiently leveraged in order to improve the accuracy and efficiency of document classification and clustering for use in AI-augmented auditing platforms.

In some embodiments, a system for automated document processing may be configured to perform automated document classification (e.g., classifying documents according to different document types) and/or document bundling. As described herein, the system may apply a set of AI methods to leverage context data in combination with a multi-page document classification ML models to accurately determine the composition of document bundles, such as document bundles received by an AI-augmented auditing platform as part of an audit review process.

Document processing, for example for the purposes of assurance, often requires verifying that a signature (or initials) appear in specific area or in association with a specific topic within a document. There may be more than one section, more than one topic, and/or more than one signature present in a single document or document bundle. Known techniques for signature detection require manual review and verification, which is inefficient and inaccurate and does not allow for processing documents at scale.

In some embodiments, a system for automated document processing may be configured to perform automated signature detection, including by applying AI models that learn where signatures are likely to occur on a given document type. During document ingestion and processing, the system may then validate that documents being processed do in fact have signatures at the expected/required locations within the documents. The systems and methods provided herein may be used to automatically process documents to determine whether said documents provide evidence, with required and sufficient signatures, to meet vouching criteria for shipments of goods, receipt of goods, agreement to contracts, or the like.

Documents stored in PDF format, image format, and other formats can contain a lot of information, and extracting said information can be an important part of AI-driven assurance processes and other tasks performed by AI-augmented auditing platforms. For example, an AI-driven assurance process may rely on automated extraction of data stored in PDFs, such that invoices and/or other pieces of piece of information (e.g., evidentiary information) may be fully considered, correctly understood, and applied as part of the audit process. Efficient processing of documents may enable an audit process to exhaustively consider all available evidentiary (e.g., documentary) data, rather than simply considering a small sample thereof.

In some embodiments, document processing and information-extraction systems described herein leverage a unique combination of (a) natural language processing using semantic and morphological analysis with (b) weak labelling based on fuzzy matching and deep learning based on text and computer vision. The combined model, configured to extract information from PDFs, may be provided an ensemble of NLP, text, and computer vision.

In some embodiments a first system is provided, the first system being for determining the composition of document bundles, the first system comprising one or more processors configured to cause the first system to: receive first input data comprising a document bundle; extract, from the document bundle, first information comprising substantive content of one or more documents of the document bundle; extract, from the document bundle, second information comprising metadata associated with one or more documents of the document bundle; generate, based on the first information and the second information, output data representing a composition of the document bundle.

In some embodiments of the first system, the output data representing a composition of the document bundle represents one or more delineations between page boundaries in the document bundle.

In some embodiments of the first system, generating the output data is further based on information obtained from an ERP system of an entity associated with the document bundle.

In some embodiments of the first system, the metadata comprises one or more of: a file name, a file extension, a file creator, a file date, and information regarding an automation process flow for acquiring the data.

In some embodiments of the first system, extracting the first information comprises applying embedded object type detection.

In some embodiments of the first system, generating the output data comprises applying a page similarity assessment model to a plurality of pages of the document bundle.

In some embodiments, a first non-transitory computer-readable storage medium is provided, the first non-transitory computer-readable storage medium storing instructions for determining the composition of document bundles, the instructions configured to be executed by one or more processors of a system to cause the system to: receive first input data comprising a document bundle; extract, from the document bundle, first information comprising substantive content of one or more documents of the document bundle; extract, from the document bundle, second information comprising metadata associated with one or more documents of the document bundle; generate, based on the first information and the second information, output data representing a composition of the document bundle.

In some embodiments, a first method is provided, the first method being for determining the composition of document bundles, wherein the first method is performed by a system comprising one or more processors, the first method comprising: receiving first input data comprising a document bundle; extracting, from the document bundle, first information comprising substantive content of one or more documents of the document bundle; extracting, from the document bundle, second information comprising metadata associated with one or more documents of the document bundle; generating, based on the first information and the second information, output data representing a composition of the document bundle.

In some embodiments, a second system is provided, the second system being for validating signatures in documents, the second system comprising one or more processors configured to cause the second system to: receive an electronic document comprising one or more signatures; apply one or more signature-extraction model to the electronic document to generate, for each of the one or more signatures in the electronic document, data representing a spatial location for the respective signature and a confidence level for the respective signature; determine, based on the data representing the spatial location and the confidence level, whether the electronic document satisfies a set of signature criteria.

In some embodiments of the second system, the one or more signature-extraction models comprise a first signature-extraction model configured to recognize signatures regardless of spatial location.

In some embodiments of the second system, the one or more signature-extraction models comprise a second signature-extraction model configured to recognize signatures based on in-document spatial location.

In some embodiments of the second system, applying the second signature-extraction model comprises: determining a predicted spatial location within the electronic document based on one or more of a structure, format, and type of the electronic document; and extracting a signature from the predicted spatial location.

In some embodiments of the second system, determining whether the electronic document satisfies the set of signature criteria comprises determining whether a signature appears in the electronic document at a required spatial location.

In some embodiments of the second system, determining whether the electronic document satisfies the set of signature criteria comprises determining the confidence level exceeds a predefined threshold.

In some embodiments of the second system, determining whether the electronic document satisfies the set of signature criteria comprises determining whether a signature appears in the electronic document within a required spatial proximity to context data extracted from the electronic document.

In some embodiments of the second system, determining whether the electronic document satisfies the set of signature criteria comprises generating an association score indicting a level of association between a signature extracted from the electronic document and context data extracted from the electronic document.

In some embodiments of the second system, the system is configured to determine the set of signature criteria based at least in part on context data extracted from the electronic document, wherein the context data indicates one or more of: document type, document structure, and document format.

In some embodiments, a second non-transitory computer-readable storage medium is provided, the second non-transitory computer-readable storage medium storing instructions for validating signatures in documents, the instructions configured to be executed by a one or more processors of a system to cause the system to: receive an electronic document comprising one or more signatures; apply one or more signature-extraction model to the electronic document to generate, for each of the one or more signatures in the electronic document, data representing a spatial location for the respective signature and a confidence level for the respective signature; determine, based on the data representing the spatial location and the confidence level, whether the electronic document satisfies a set of signature criteria.

In some embodiments, a second method is provided, t second method being for validating signatures in documents, wherein the second method is performed by a system comprising one or more processors, the second method comprising: receiving an electronic document comprising one or more signatures; applying one or more signature-extraction model to the electronic document to generate, for each of the one or more signatures in the electronic document, data representing a spatial location for the respective signature and a confidence level for the respective signature; determining, based on the data representing the spatial location and the confidence level, whether the electronic document satisfies a set of signature criteria.

In some embodiments, a third system is provided, the third system being for extracting information from documents, the third system comprising one or more processors configured to cause the third system to: receive a data set comprising a plurality of electronic documents; apply a set of data conversion processing steps to the plurality of electronic documents to generate a processed data set comprising structured data generated based on the plurality of electronic documents, wherein applying set of data conversion processing steps comprises applying one or more deep-learning-based optical character recognition (OCR) models; and apply a set of knowledge-based modeling processing steps to the structured data, wherein applying the set of knowledge-based modeling processing steps comprises: receiving user input indicating a plurality of data labels for the structured data; and applying a knowledge-based deep learning model based on the structured data and the plurality of data labels; and generating output data extracted from the plurality of electronic documents.

In some embodiments of the third system, applying the set of data conversion processing steps comprises, before applying the one or more deep-learning-based OCR models, applying an automated orientation correction processing step.

In some embodiments of the third system, applying the set of data conversion processing steps comprises, before applying the one or more deep-learning-based OCR models, applying a denoising function.

In some embodiments of the third system, applying the one or more deep-learning-based OCR models comprises: applying a text-detection model; and applying a text-recognition model.

In some embodiments of the third system, applying the set of data conversion processing steps comprises, after applying the one or more deep-learning-based OCR models, applying an image-level feature engineering processing step to generate the structured data.

In some embodiments of the third system, applying the set of data conversion processing steps comprises applying a post-processing method that uses morphology to parse structural relationships amongst words.

In some embodiments of the third system, applying the set of knowledge-based modeling processing steps comprises, before receiving the user input indicating the plurality of data labels, applying one or more feature engineering processing steps to the structured data to generate In some embodiments of the third system, applying the one or more feature engineering processing steps comprises predicting word groups based on morphology.

In some embodiments of the third system, applying the set of knowledge-based modeling processing steps comprises receiving user input specifying user-defined feature engineering.

In some embodiments of the third system, applying the set of knowledge-based modeling processing steps comprises applying fuzzy matching, wherein the system is configured to consider a partial match sufficient for labeling purposes, to automatically label documents on a word-by-word basis.

In some embodiments of the third system, applying the set of knowledge-based modeling processing steps comprises automatically correcting one or more text-recognition errors during a training process.

In some embodiments of the third system, the knowledge-based deep learning model comprises a loss function that is configured to accelerate convergence of the knowledge-based deep learning model.

In some embodiments of the third system, the knowledge-based deep learning model comprises one or more layers using natural language processing (NLP) embedding such that the model learns both content information and related location information.

In some embodiments of the third system, the knowledge-based deep learning model is trained using an adaptive feeding method.

In some embodiments of the third system, the knowledge-based deep learning model comprises an input layer that applies merged embedding and feature engineering.

In some embodiments of the third system, the knowledge-based deep learning model comprises an input layer that is configured for variant batch sizes.

In some embodiments of the third system, the knowledge-based deep learning model comprises an input layer that applies a sliding window.

In some embodiments of the third system, the knowledge-based deep learning model comprises one or more fully-dense layers disposed between an input layer and a prediction layer.

In some embodiments of the third system, the knowledge-based deep learning model comprises a prediction layer that generates one or more metrics for presentation to a user.

In some embodiments, a third non-transitory computer-readable storage medium is provided, the third non-transitory computer-readable storage medium storing instructions for extracting information from documents, the instructions configured to be executed by one or more processors of a system to cause the system to: receive a data set comprising a plurality of electronic documents; apply a set of data conversion processing steps to the plurality of electronic documents to generate a processed data set comprising structured data generated based on the plurality of electronic documents, wherein applying set of data conversion processing steps comprises applying one or more deep-learning-based optical character recognition (OCR) models; and apply a set of knowledge-based modeling processing steps to the structured data, wherein applying the set of knowledge-based modeling processing steps comprises: receiving user input indicating a plurality of data labels for the structured data; and applying a knowledge-based deep learning model based on the structured data and the plurality of data labels; and generating output data extracted from the plurality of electronic documents.

In some embodiments, a third method is provided, the third method for extracting information from documents, wherein the third method is executed by a system comprising one or more processors, the third method comprising: receiving a data set comprising a plurality of electronic documents; applying a set of data conversion processing steps to the plurality of electronic documents to generate a processed data set comprising structured data generated based on the plurality of electronic documents, wherein applying set of data conversion processing steps comprises applying one or more deep-learning-based optical character recognition (OCR) models; and applying a set of knowledge-based modeling processing steps to the structured data, wherein applying the set of knowledge-based modeling processing steps comprises: receiving user input indicating a plurality of data labels for the structured data; and applying a knowledge-based deep learning model based on the structured data and the plurality of data labels; and generating output data extracted from the plurality of electronic documents.

In some embodiments, a fourth system is provided, the fourth system being for determining the composition of document bundles, the fourth system comprising one or more processors configured to cause the first system to: receive data comprising a document bundle; extract, from the document bundle, first information comprising substantive content of one or more documents of the document bundle; extract, from the document bundle, second information comprising metadata associated with one or more documents of the document bundle; generate, based on the first information and the second information, output data representing a composition of the document bundle.

In some embodiments, a fourth non-transitory computer-readable storage medium is provided, the fourth non-transitory computer-readable storage medium storing instructions for determining the composition of document bundles, the instructions configured to be executed by one or more processors of a system to cause the system to: receive data comprising a document bundle; extract, from the document bundle, first information comprising substantive content of one or more documents of the document bundle; extract, from the document bundle, second information comprising metadata associated with one or more documents of the document bundle; generate, based on the first information and the second information, output data representing a composition of the document bundle.

In some embodiments, a fourth method is provided, the fourth method being for determining the composition of document bundles, wherein the fourth method is performed by a system comprising one or more processors, the fourth method comprising: receiving data comprising a document bundle; extracting, from the document bundle, first information comprising substantive content of one or more documents of the document bundle; extracting, from the document bundle, second information comprising metadata associated with one or more documents of the document bundle; generating, based on the first information and the second information, output data representing a composition of the document bundle.

In some embodiments, a fifth system is provided, the fifth system being for validating signatures in documents, the fifth system comprising one or more processors configured to cause the fifth system to: receive an electronic document comprising one or more signatures; apply one or more signature-extraction models to the electronic document to generate, for each of the one or more signatures in the electronic document, data representing a spatial location for the respective signature and a confidence level for the respective signature; determine, based on the data representing the spatial location and the confidence level, whether the electronic document satisfies a set of signature criteria.

In some embodiments, a fifth non-transitory computer-readable storage medium is provided, the fifth non-transitory computer-readable storage medium storing instructions for validating signatures in documents, the instructions configured to be executed by a one or more processors of a system to cause the system to: receive an electronic document comprising one or more signatures; apply one or more signature-extraction models to the electronic document to generate, for each of the one or more signatures in the electronic document, data representing a spatial location for the respective signature and a confidence level for the respective signature; determine, based on the data representing the spatial location and the confidence level, whether the electronic document satisfies a set of signature criteria.

In some embodiments, a fifth method is provided, the fifth method being for validating signatures in documents, wherein the fifth method is performed by a system comprising one or more processors, the fifth method comprising: receiving an electronic document comprising one or more signatures; applying one or more signature-extraction models to the electronic document to generate, for each of the one or more signatures in the electronic document, data representing a spatial location for the respective signature and a confidence level for the respective signature; determining, based on the data representing the spatial location and the confidence level, whether the electronic document satisfies a set of signature criteria.

In some embodiments, a sixth method is provided, the sixth method being for extracting information from documents, the system comprising one or more processors configured to cause the system to: receive a data set comprising a plurality of electronic documents; apply a set of data conversion processing steps to the plurality of electronic documents to generate a processed data set comprising structured data generated based on the plurality of electronic documents, wherein applying set of data conversion processing steps comprises applying one or more deep-learning-based optical character recognition (OCR) models; and apply a set of knowledge-based modeling processing steps to the structured data, wherein applying the set of knowledge-based modeling processing steps comprises: receiving user input indicating a plurality of data labels for the structured data; and applying a knowledge-based deep learning model trained based on the structured data and the a plurality of data labels indicated by one or more user inputs; and generating output data extracted from the plurality of electronic documents by the deep learning model.

In some embodiments, a sixth non-transitory computer-readable storage medium is provided, the sixth non-transitory computer-readable storage medium storing instructions for extracting information from documents, the instructions configured to be executed by one or more processors of a system to cause the system to: receive a data set comprising a plurality of electronic documents; apply a set of data conversion processing steps to the plurality of electronic documents to generate a processed data set comprising structured data generated based on the plurality of electronic documents, wherein applying set of data conversion processing steps comprises applying one or more deep-learning-based optical character recognition (OCR) models; and apply a set of knowledge-based modeling processing steps to the structured data, wherein applying the set of knowledge-based modeling processing steps comprises: applying a knowledge-based deep learning model trained based on the structured data and a plurality of data labels indicated by one or more user inputs; and generating output data extracted from the plurality of electronic documents by the deep learning model.

In some embodiments, a sixth method is provided the sixth method being for extracting information from documents, wherein the sixth method is executed by a system comprising one or more processors, the sixth method comprising: receiving a data set comprising a plurality of electronic documents; applying a set of data conversion processing steps to the plurality of electronic documents to generate a processed data set comprising structured data generated based on the plurality of electronic documents, wherein applying set of data conversion processing steps comprises applying one or more deep-learning-based optical character recognition (OCR) models; and applying a set of knowledge-based modeling processing steps to the structured data, wherein applying the set of knowledge-based modeling processing steps comprises: applying a knowledge-based deep learning model trained based on the structured data and a plurality of data labels indicated by one or more user inputs; and generating output data extracted from the plurality of electronic documents by the deep learning model.

In some embodiments, any one or more of the features, characteristics, or aspects of any one or more of the above systems, methods, or non-transitory computer-readable storage media may be combined, in whole or in part, with one another and/or with any one or more of the features, characteristics, or aspects (in whole or in part) of any other embodiment or disclosure herein.

BRIEF DESCRIPTION OF THE FIGURES

Various embodiments are described with reference to the accompanying figures, in which:

FIG. 7 shows a comparison between DeepOCR and OCR Engine, in accordance with some embodiments.

FIG. 19 shows output generated by techniques disclosed herein, in accordance with some embodiments.

FIG. 20 shows labeling of a CSV file, in accordance with some embodiments.

FIG. 21 shows an example image that may be used as a basis for feature engineering, in accordance with some embodiments.

FIG. 23 shows output data from a named-entity recognition model, in accordance with some embodiments.

DETAILED DESCRIPTION

Figure 1:
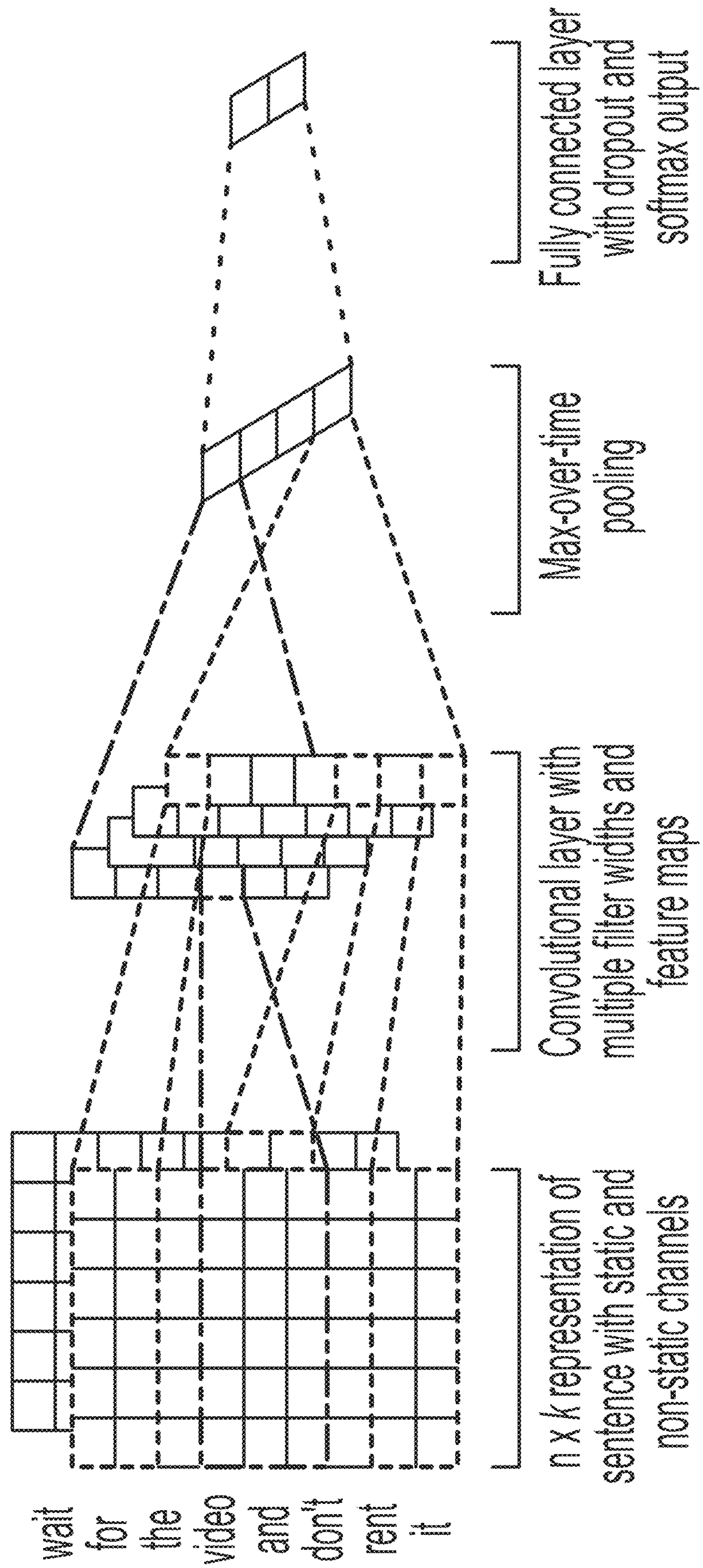
FIG. 1 shows an exemplary architecture for text deep-learning model, in accordance with some embodiments.

Disclosed herein are systems and methods for providing AI-augmented auditing platforms, including techniques for automated document processing. As described below, automated document processing that may be performed by an AI-augmented auditing platform may include one or more of: automated classification (and clustering) of documents, automated signature detection within documents, and weak-leaning AI/ML processing techniques for extracting information from documents.

As described herein, a system for providing AI-augmented auditing platforms may be configured to receive one or more documents as input data and to perform automated processing of the input documents. The documents may be received as structured or unstructured electronic data, received from one or more data sources, and the system may subject the received documents to one or more document processing techniques in order recognize information content within the documents, extract information content from the documents, and generate, store, and leverage data resulting from the document processing techniques. As explained herein, the document processing techniques may, in some embodiments, include application of one or more machine learning models.

Document Classification and Clustering

Known techniques for document classification do not adequately leverage context data to guide document classification, especially in the context of audit processes. As described herein, context data that is available in audit processes may be effectively and efficiently leveraged in order to improve the accuracy and efficiency of document classification and clustering for use in AI-augmented auditing platforms.

In some embodiments, a system for automated document processing may be configured to perform automated document classification (e.g., classifying documents according to different document types) and/or document bundling. As described herein, the system may apply a set of AI methods to leverage context data in combination with a multi-page document classification ML models to accurately determine the composition of document bundles, such as document bundles received by an AI-augmented auditing platform as part of an audit review process.

The system may be configured to receive data representing one or more documents and to apply one or more AI methods to the received data in order to recognize and extract information from said documents and in order to classify and/or cluster said documents. The AI methods may be configured to perform analyses on the basis of substantive document content (e.g., characters, text, and/or images in the documents), on the basis of metadata stored as a part of or in association with said document, and/or on the basis of context data associated with said documents.

In some embodiments, metadata stored as a part of or in association with said document may include data such as document format data, document section data, page number data, font data, document layout data, document creator data, document creation time data, document title data, and/or any other suitable metadata that may pertain to all or part of a document bundle. In some embodiments, metadata may include one or more of: information obtained from file names of one or more documents, information obtained from file extensions of one or more documents, information obtained from file metadata (e.g., creator, date, etc.) of one or more documents In some embodiments, external context data may include one or more of: information regarding one or more automation processes used in acquiring the document data (and/or context data) from one or more systems (e.g., from enterprise resource planning (ERP) systems or databases); information regarding one or more requests to which the documents were responsive; information regarding one or more parties from whom the documents were requested and/or to whom the documents pertain; and information regarding a manner (e.g., a communication medium) by which the documents were provided In some embodiments, contextual data may include information regarding one or more processes, protocols, and/or standards to which the documents pertain. For example, contextual data may indicate information about a series of steps in a predefined process (e.g., a business process) or a series of documents types in a predefined set of document types. In determining demarcations between document boundaries, one or more data processing models applied by the system may be configured to identify document types (e.g., to identify demarcations between documents in a bundle) in a predefined set of document types and/or to identify documents pertaining to steps in a predefined process. In some embodiments, a data processing operation may be configured to identify document types (e.g., to identify demarcations between documents in a bundle) in accordance with a predefined order of steps and/or a predefined order of document types as indicated by contextual data. (Any data processing operation referenced herein may include application of one or more models trained by machine-learning.)

Context data may be received by the system from any one or more suitable data sources, may be indicated by one or more user inputs detected by the system, and/or may be deduced by one or more data processing models of the system. Leveraging context data may provide a bridge for the system to introduce prior knowledge and understand the documents within the environment in which the document data (e.g., unstructured data) is provided.

The system may be configured to apply one or more data processing algorithms, models, and/or machine learning models (including, e.g., a sequence of machine learning techniques) to identify document types for document bundles, for single documents, and/or for single pages of documents. In some embodiments, the system (e.g., the one or more machine learning models) may be configured to delineate document-type boundaries within a document bundle in order to identify demarcations between separate documents within the document bundle Identification of document-type boundaries within a document bundle may be based on one or more of the following: determination of a document type for a page within the document bundle, determination of similarity (e.g., a similarity score) between two or more pages within a document bundle, and/or detection and assessment of one or more embedded objects within a document (including determination of similarity (e.g., a similarity score) between two or more embedded objects within a document). The system may be configured to detect transitions within a document bundle—e.g., detected on the basis of a change within the document bundle in one or more of document content, document type, document metadata, document format, and/or embedded object characteristics—and to classify different portions of the document (and identify document boundaries within the document bundle) on the basis of said transitions.

The system may be configured for the purposes of information integrity in the auditing process.

In some embodiments, the system may receive data comprising a document bundle and may extract, from the received data, document content information and/or metadata information. In some embodiments, the system may extract context information from the received document data. In some embodiments, the system may receive context information from one or more additional data sources (e.g., separate from the data sources from which the document data was received), and may correlate the received context information with the document bundle data. In some embodiments, extracting the document content information includes applying embedded object type detection.

The system may then use the document content information, metadata extracted from said documents, and/or the context information to generate output data representing a composition of the document bundle, wherein the output information may indicate one or more document types for the document bundle, a plurality of document types within the document bundle, and/or information regarding demarcations between (e.g., page breaks between) different documents within the document bundle. In some embodiments, generating the output data comprises applying a page similarity assessment model to a plurality of pages of the document bundle.

In some embodiments, generating the output data comprises applying one or more data processing operations to model a state of a document bundle being processed. In some embodiments, the document bundle may be modeled using a finite state model. In some embodiments, a model of the document bundle may be used to leverage a calculated likelihood that a subsequent page in a document bundle is part of the same document (e.g., the same classification, the same type) as the current page of the document. For example, a model may be used to make determinations by leveraging contextual data about the manner in which documents are normally arranged (for example about the manner in which pages from different documents are not normally randomly interleaved with one another, but are usually arranged into contiguous portions of a document bundle).

In some embodiments, generating the output data comprises applying one or more data processing operations to analyze the presence or absence of one or more embedded objects within a document. For example, the system may apply one or more rules and/or models regarding whether certain document types are associated with certain embedded object types. For example, embedded signature objects may be associated with certain document types and therefore may be recognized by the system and used to identify said associated certain document types.

In some embodiments, the system may apply a page-similarity model as part of a document-understanding pipeline. In some embodiments, a page-similarity model may be the first step applied in a document-understanding pipeline. In some embodiments, a page similarity model (e.g., Random Forest) may determine if two pages belong to the same document. This may be useful because multiple documents may be bundled into a single PDF file before being provided to the system. The page-similarity model may include one or more of the following: a random forest classification of image features (e.g., low-level image features) such as Oriented FAST and rotated BRIEF (ORB), Structural Similarity (SSIM) index, and histograms of images using different distance metrics such as correlation, chi-squared, intersection, Hellinger, etc.

In some embodiments, the system may apply a text and low-level features model (TFIDF+VGG16+SVM). The text and low-level features model may include two parts: a page-similarity module and a page-classification module. In some embodiments, the page-similarity module of the text and low-level features model may share any one or more characteristics in common with the page-similarity model described above. In some embodiments, the page-classification module may be configured to classifying the one or more pages (e.g., the first page) of a bundle of documents determined using a Support Vector Machine (SVM) classifier and features as the image text through TFIDF and visual features of the VGG16 Model.

In some embodiments, the system may apply a text deep-learning model (e.g., embeddings+1D-CNN). In some embodiments, the text deep-leaning model may use text extracted from an image to classify documents using embeddings. More specifically, the words may be tokenized and embedded using Word2Vec, and they may then be passed through a shallow CNN for classification. The architecture, according to some embodiments, is shown in FIG. 1.

Figure 2:
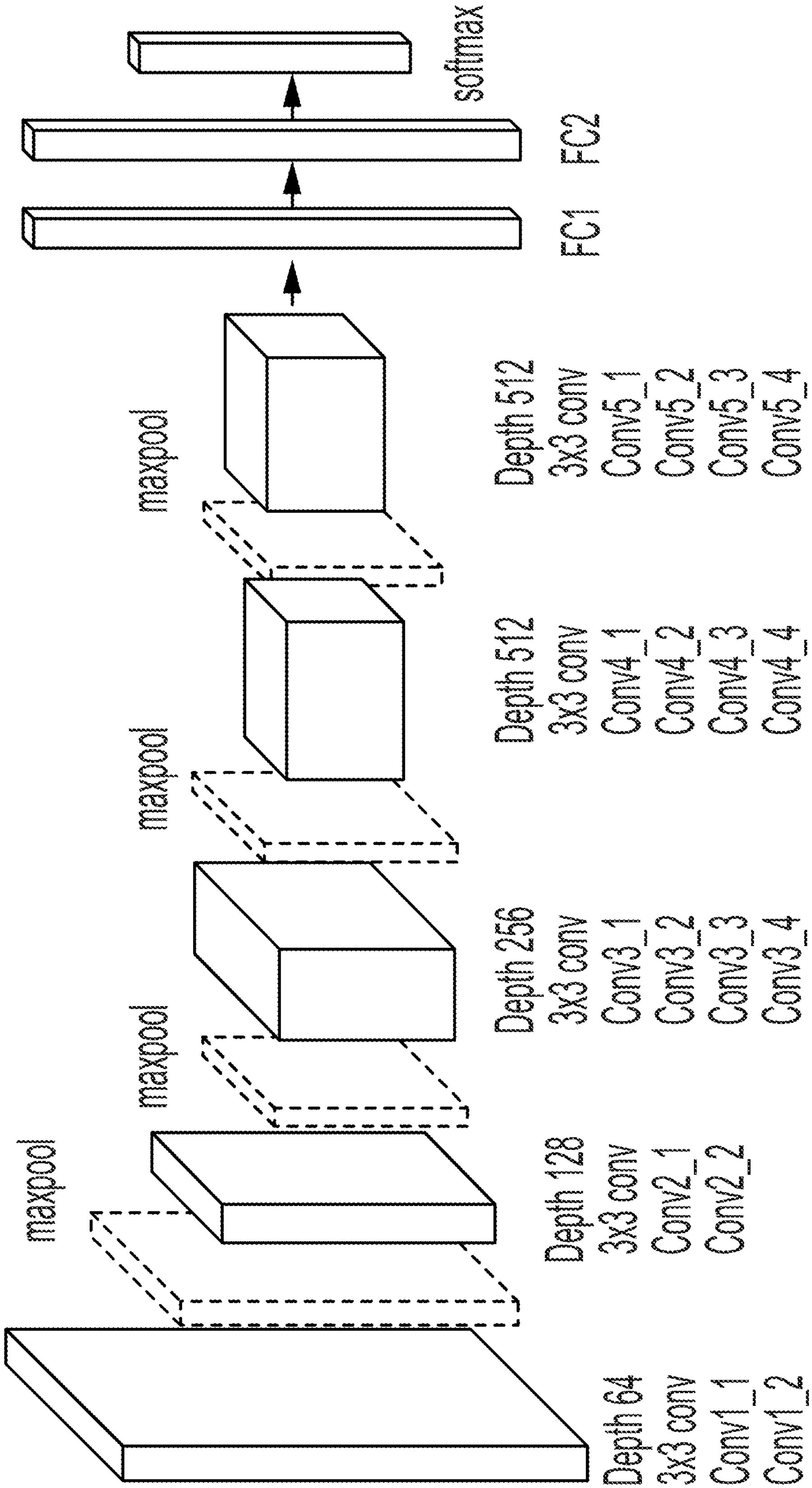
FIG. 2 shows an exemplary architecture for a visual deep learning model, in accordance with some embodiments.

In some embodiments, the system may apply a visual deep learning model (e.g., VGG19 Transfer Learning). FIG. 2 shows an exemplary architecture for a visual deep learning model, in accordance with some embodiments. The visual deep learning model may be configured to identify visual features using the VGG19 Deep Convolutional Neural Network architecture shown below. The model may load weights trained using, e.g., imagenet, and may train the last two layers of the model.

In some embodiments, the system may apply a Siamese model (e.g., Embeddings & 1D-CNN+VGG19 Transfer Learning). The Siamese model may combine text and visual features for a Siamese deep-learning classification. The features coming in from the two above models may be concatenated and passed through a dense layer for classification.

In some embodiments, the system may apply a document clustering model. The document clustering model may select a diverse sample data set from a large data set for model training purposes.

Table 1 below shows performance of various models, in one example. The test data used to generate the results data in Table 1 included data from the same clients whose data was used to train the models. The pilot data included data from clients that the model was not trained on. Therefore, the pilot data result may be a better indicator of the model's performance with unseen data.

TABLE 1

| — | Precision Score | Retrained SVM Model | Word2Vec Embeddings + CNN | Keras Embeddings + CNN | Deep CNN Model | Siamese Model |
|---|---|---|---|---|---|---|
| Test | BOL | 0.92 | 0.9 | 0.91 | 0.4 | 0.96 |
| | Invoice | 0.93 | 0.98 | 1.00 | 0.31 | 0.97 |
| | Others | 0.94 | 0.88 | 0.93 | 0.06 | 0.98 |
| | PO | 0.84 | 0.87 | 0.98 | 0.04 | 0.76 |
| Pilot | BOL | 0.28 | 0.35 | 0.52 | 0.29 | 0.11 |
| | Invoice | 0.25 | 0.9 | 0.92 | 0.00 | 0.00 |
| | Others | 0.5 | 0.67 | 0.00 | 0.33 | 0.33 |
| | PO | 0.09 | 0.12 | 0.13 | 0.09 | 0.08 |

In some embodiments, the system may automatically leverage output data generated as described herein in or more functionalities provided by the AI-augmented auditing platform. For example, the system may automatically generate and store individual document files for each separate document recognized within the document bundle. In some embodiments, the system may individually leverage separate documents recognized within the document bundle as separate pieces of evidence in one or more auditing assessments, including an AI-augmented auditing process that uses the document data in order to perform one or more vouching processes, adjudication processes, recommendation generation processes, information integrity processes, and/or data integrity processes.

Signature Detection

Document processing, for example for the purposes of assurance, often requires verifying that a signature (or initials) appear in specific area or in association with a specific topic within a document. There may be more than one section, more than one topic, and/or more than one signature present in a single document or document bundle. Known techniques for signature detection require manual review and verification, which is inefficient and inaccurate and does not allow for processing documents at scale.

In some embodiments, a system for automated document processing may be configured to perform automated signature detection, including by applying AI models that learn where signatures are likely to occur on a given document type. During document ingestion and processing, the system may then validate that documents being processed do in fact have signatures at the expected/required locations within the documents. The systems and methods provided herein may be used to automatically process documents to determine whether said documents provide evidence, with required and sufficient signatures, to meet vouching criteria for shipments of goods, receipt of goods, agreement to contracts, or the like.

As explained herein, the system may receive one or more input documents to be processed for signature detection and/or automated vouching analysis. The system may apply one or more AI models to detect information regarding the document type, document structure, and/or document format of the received document. In some embodiments, determination of document type may be based at least in part on recognition of one or more signatures within the document. For example, the presence of a single signature, corresponding pairs of signatures, no signatures, certain kinds of signatures, and/or signatures in certain pages and/or certain sections may be associated by one or more rules or models with certain document types, and the system may leverage said rules/models in order to recognize said document types.

In some embodiments, once the system has generated information for the document to be analyzed representing the document type, document structure, and/or document format, the system may then determine, for the document be analyzed, one or more signature requirement criteria. The signature requirement criteria may be determined based on the document type, document structure, and/or document format. In some embodiments, the system may determine signature requirement criteria for various document types, document structures, and/or document formats using one or more machine learning models trained on signed documents of various types, structures, and/or formats. In some embodiments, the system may determine signature requirement criteria based on one or more predefined signature criteria rules.

In some embodiments, the signature criteria that are determined may include one or more of: a location for a signature, a document section to which a signature corresponds, document content to which a signature corresponds, a type of signature (e.g., hand-written, e-signature, initials, etc.), an order of signatures, and/or a date of a signature.

One the system has determined the signature criteria for the document, the system may then assess the document to determine whether those one or more signature criteria are satisfied. The system may for example, apply one or more signature detection models to extract signature information from the document, wherein the extracted information may indicate signature presence, signature identity, signature location, association of a signature with a document section and/or with document content, and/or signature type. (In some embodiments signature detection models may be applied before and/or after document-type detection is performed and before and/or after signature criteria for the document are required. For example, in instances in which signature detection is used to determine document type, the signature detection models may have been applied before determination of the signature criteria for the document.)

In some embodiments, the one or more signature detection models may include one or more context-less signature detection models that have been trained on signatures and non-signatures regardless of location within a document. In some embodiments, the one or more signature detection models may include one or more context-dependent signature detection models that account for context in determining whether and where a signature is detected.

In some embodiments, the system may be configured such that, for each signature detected within a document, the system generates (a) a spatial location within the document at which the signature was detected and (b) a confidence level for the detected signature. In some embodiments, the generated confidence level may indicate a degree of confidence that a signature was detected and/or may indicate a degree of confidence regarding the location at which the signature was detected. In some embodiments, the system may be configured such that, for each signature detected within a document, the system generates (c) signature characteristic data indicating one or more characteristics of the signature (e.g., signature quality, signature type, signature identity, signature date, signature order, etc.) and optionally indicating respective confidence values associated with one or more of said characteristics.

The system may compare the extracted signature information to the determined signature criteria and may generate one or more outputs indicating whether one or more signature criteria for the document are satisfied. The system may, in some embodiments, indicate that signature criteria are satisfied, that signature criteria are not satisfied, or that a determination as to whether signature criteria are satisfied cannot be made. In some embodiments, outputs indicating whether signature criteria are satisfied may include one or more confidence scores indicating a degree of confidence in one or more of the conclusions.

In some embodiments, evaluating whether a signature meets signature criteria for a document may be based, at least in part, on associating signature-context data (wherein the context data may be associated with and/or extracted from the document) with one or more signatures within the document. For example, the system may associate signature-context data-such as information regarding document sections, identities of one or more parties relevant to the document, spatial location within a document, etc.—with one or more detected signatures. Detected signatures may, in some embodiments, be associated with signature-context data from the document on the basis of spatial proximity of the signature location and of a location from which the context data was extracted. In some embodiments, association between a signature and signature-context data may be quantified by an association score (e.g., indicating a level of confidence in the association). In some embodiments, the system may then evaluate the document's compliance with one or more signature criteria on the basis of the determined association and/or the determined association score.

In some embodiments, selection of one or more signatures for use in evaluating compliance with signature criteria may be based on one or both of: (a) a confidence score for identification of the signature and/or signature information itself, and (b) an association score for association of an identified signature with document context (e.g., based on spatial proximity in the document). In some embodiments, evaluation of compliance with signature criteria may be based on one or both of a confidence score and an association score. In some embodiments, an overall relevance ranking may be based on both a confidence score and an association score.

Associations between signatures and signature-context data made by the system may be one-to-one, one-to-many, many-to-one, or many-to-many. In some embodiments, the system may rank associations between a signature and various signature-context data (or between a signature-context data and various signatures) and may assign as association score to each association. In some embodiments, the system may select the highest-ranked association and may evaluate compliance with signature criteria on the basis of the signature-context association indicated by the highest-ranked association (and/or on the basis of the association score of the highest-ranked association).

In some embodiments, signatures may be ranked by signature confidence score for detection/recognition of a signature, association score, and/or an overall (e.g., combined) confidence score based on both of the preceding scores (and optional other factors). In some embodiments, selection of a signature for evaluation and/or evaluation itself of a signature for signature-criteria compliance may be based on any one or more of: signature confidence, association score, and/or overall (e.g., combined) confidence score.

Signature-Detection Example

A customized pipeline was developed with a YOLO model that leverages transfer learning. The pipeline is configured to receive PDF documents, to detect pages within the PDF documents that contains a signature, and to generate output data indicating a page number and a confidence score for each signature detected.

A connected component analysis approach was developed as follows:

Step 1—Detect designated boxes using contour detection with parameters (lower half of page~30%, min height & width of contour)

Step 2—Identify box type by Tesseract OCR (keywords 'SHIPPER' and 'CARRIER')

Step 3—Perform CCL Analysis on each box to extract larger connected components (like signatures and handwritten text)

Step 4—Generate output by overlaying outputs of only bounding boxes on whitespace Step 5—Get Abby Ground Truth for boxes by parsing xml files to get bounding box details Step 6—Check accuracy by performing IoU of ground truth bounding boxes on input image and output image Weak Learning for AI-Augmented Assurance Documents stored in PDF format, image format, and other formats can contain a lot of information, and extracting said information can be an important part of AI-driven assurance processes and other tasks performed by AI-augmented auditing platforms. For example, an AI-driven assurance process may rely on automated extraction of data stored in PDFs, such that invoices and/or other pieces of piece of information (e.g., evidentiary information) may be fully considered, correctly understood, and applied as part of the audit process. Efficient processing of documents may enable an audit process to exhaustively consider all available evidentiary (e.g., documentary) data, rather than simply considering a small sample thereof.

Existing solutions include, for richly formatted PDF's: creation of 'knowledge base construction.' However, this solution relies on underlying structure of PDFs, and cannot work on scanned PDF documents where the underlying structure is not known. Existing solutions include, for scanned PDF documents, optical character recognition (OCR) and NLP. However, these solutions rely on templatization of PDFs and surrounding words, and they cannot work with too many varied formats and/or visual relations. According to known techniques, automatic extraction of information from electronic formats such as PDF and image formats is inefficient, inaccurate, and time consuming. The known alternative—review by humans—is also costly and inefficient. Known automated information-extraction solutions use pre-trained models to extract text from data, but they require annotated PDFs to train computer vision models that can extract such information. Creating these annotations to train models is in itself an expensive activity.

Known solutions are Fonduer and OCR assisted methods. Fonduer's pipeline strongly relies on parsing PDFs to HTMLs. A perfect conversion could retain as much information as possible, which makes Fonduer advanced. However, the application of Fonduer is limited because few software can completely support this process. As for OCR assisted methods, OCR engines such as Abbyy deal with well scanned documentation. Abbyy can extract information from documents, but users still need to apply extra efforts to extract entities that are actually needed. NLP and other AI methods, which use semantic information among all extracted words to improve extraction on target entities, are commonly used to work toward that goal. As these solutions do not consider structural information, they is not robust enough for noisy documents with complex underlying structures.

The systems and methods described herein may address one or more of the above-identified shortcomings of existing solutions.

Disclosed herein are systems and methods for automated information extraction that may address one or more of the above-identified shortcomings. In some embodiments, document processing and information-extraction systems described herein leverage a unique combination of (a) natural language processing using semantic and morphological analysis with (b) weak labelling based on fuzzy matching and deep learning based on text and computer vision. The combined model, configured to extract information from PDFs, may be provided an ensemble of NLP, text, and computer vision. The systems and methods described herein may provide accurate and efficient information extraction from PDF documents and from evidence data provided in other formats, may overcome one or more of the above-identified shortcomings of known solutions, and may overcome the problem of cold start for documents (where annotated data does not exist and creation of annotations is expensive). Information that may be accurately and efficiently extracted by the techniques disclosed herein include, for example, invoice amount, number, agency name, committee, etc.

Regarding the task of creation of annotations, ground truth data from which annotations can be created may, in some embodiments, exist in one or more data sources, such as in an ERP database or system. However, the ground truth data may exist in a format (e.g., a normalized format) that does not perfectly (e.g., word for word) match content in documents to be processed by the system word. This may further complicate the task of creating annotations. The systems and methods disclosed herein overcome this challenge by applying weak labeling (fuzzy matching), in which an entity in a ground-truth data source (e.g., an ERP system) only needs to partially match an entity in a processed document (e.g., in a PDF) for the system to generate labels based on that partial match, such that the model can learn from those labels.

Described below are some embodiments of systems and methods for knowledge-based information extraction from richly formatted digital documentation. While the below description is made mostly with reference to PDF documents, the techniques described herein may also be applied to webpages, business reports, product specifications, scientific literature, and any other suitable document type. As described below, systems may process input documents/data as an image, so any input data that is (or can be) formatted as an image may be suitable.

Figure 3:
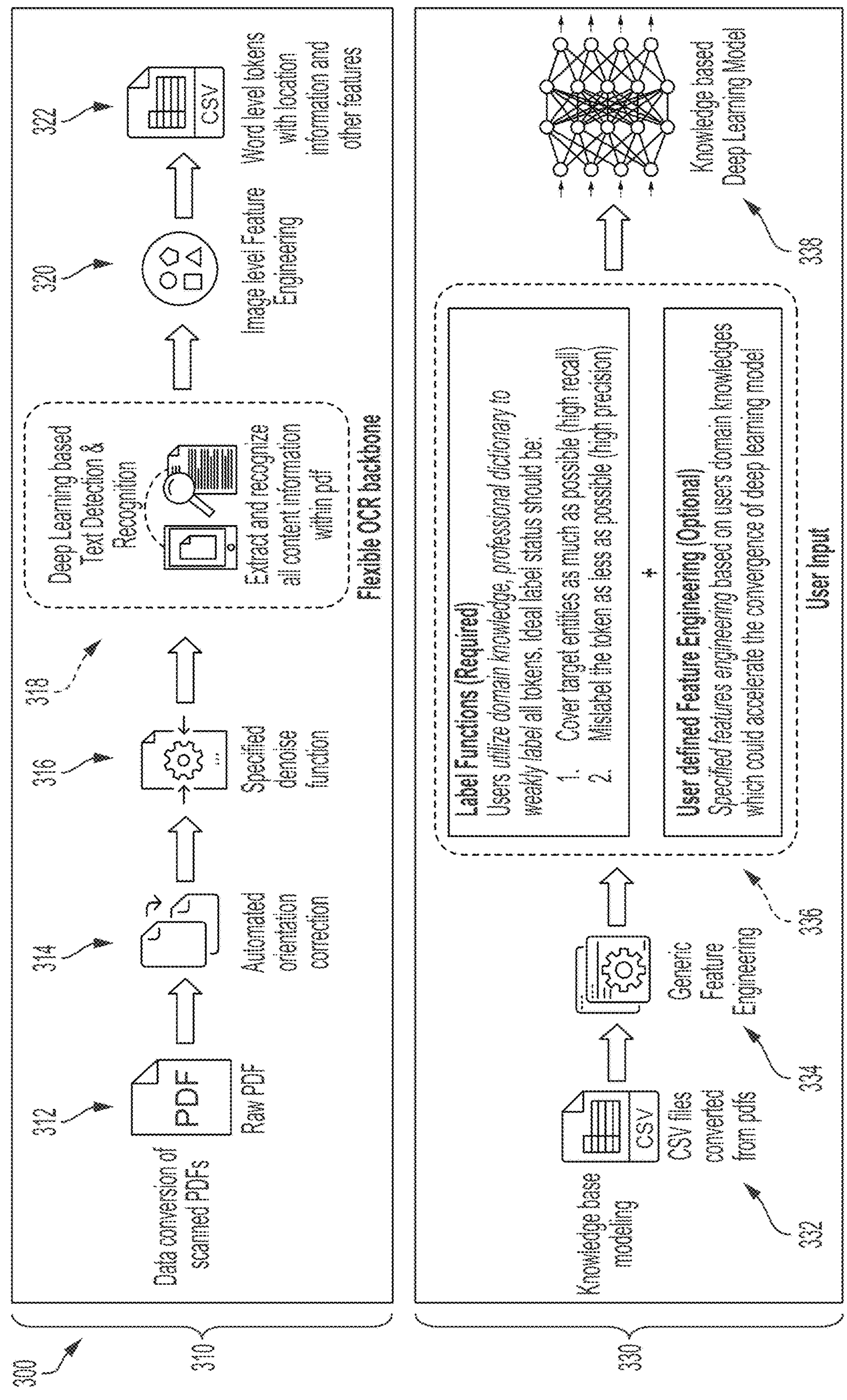
FIG. 3 shows a schematic diagram of a two-part pipeline for knowledge-based information extraction from richly formatted digital documentation, in accordance with some embodiments.

Systems and methods described herein may provide a pipeline for knowledge-based information extraction from richly formatted digital documentation, wherein the pipeline includes two portions: first, the document conversion portion and, second, a knowledge modeling portion. FIG. 3 depicts a schematic diagram of a training process for a two-part pipeline 300 for knowledge-based information extraction from richly formatted digital documentation, in accordance with some embodiments. The model may include an ensemble of an NLP model on handcrafted features and a computer vision model that improves in accuracy over time through self-learning and validation mechanisms. Described herein are characteristics of such pipelines for knowledge-based information extraction from richly formatted digital documentation, in accordance with some embodiments.

As shown in FIG. 3, pipeline 300 may include a data-conversion portion 310 and a knowledge-based modeling portion 330.

In the first portion 310 of the two-part pipeline 300, the system may convert PDFs to database. For this process, one or more deep learning models (e.g., DeepOCR) may be applied; said models may include a text detection model and a text recognition model. Said models may be used to extract words (e.g., every word) instead of using OCR engine. This may enable stronger abilities and more robust performance on extracting information from both clean and noisy documents. Due to the capacity constraint of OCR, it is not guaranteed that all the information in the documents can be detected. Thus, systems and methods described herein may combine computer vision with DeepOCR called 'Canvas', which could automatically supplement the missed information by DeepOCR without human interactions. After the conversion, a specific post processing method may be applied, wherein the post-processing method introduces morphology to better parse the structural relationship among words. For instance, dilation and erosion with customized kernels may be used to tell whether nearby words are from the same word group or paragraph.

In some embodiments, in the first portion 310 of the two-part pipeline 300, steps 312-322 as described below may be applied.

At block 312, in some embodiments, the system may receive input data comprising one or more documents to be processed. In some embodiments, the input data may comprise PDF data, image data, and/or document data in any other suitable format. The input data may be received from any suitable data source such as one or more databases, data stores, network sources, or the like. The input data may be received according to a predefined schedule, as part of an inbound network transmission, as part of a scraping operation, in response to a user request, and/or as part of a manual data upload. The received data may be stored locally and/or remotely following receipt.

At block 314, in some embodiments, the system may apply one or more automated orientation correction data processing operations to the received data in order to correct/normalize the orientation of pages in the documents.

At block 316, in some embodiments, the system may apply one or more denoising data processing operations to the orientation-corrected data. The one or more denoising operations may in some embodiments comprise data normalization operations. The one or more denoising operations may in some embodiments be selected based on user input, system settings, identity of one or more parties associated with the documents being processed, industry of one or more parties associated with the documents being processed, and/or document type (e.g., as automatically determined by the system) of one or more of the documents being processed.

At block 318, in some embodiments, the system may apply one or more deep-learning based text detection and recognition operations. In some embodiments, said operations may include a flexible OCR operation. In some embodiments, the text detected and recognized at block 318 may comprise all character data that can be recognized within processed data. In some embodiments, the recognized character data may be stored in association with metadata indicating a spatial location of each recognized character within the document in which it was recognized.

At block 320, in some embodiments, one or more image-level feature engineering processes may be applied to the data generated at block 318 in order to select features to be used to generate feature data. During the training process, block 320 may be applied in order to determine which features to use to train the model. During subsequent application of the model, after training has been completed, block 320 may simply entail extracting the features that have been previously identified by the feature engineering process during training, and using those extracted features to generate feature data to be processed and analyzed by the trained model. Feature data generated at block 320 may comprise text data such as character data, word data, sentence data, paragraph data, section data. Feature data generated at block 320 may comprise location data (e.g., indicating a spatial location within a page) associated with any text data. Feature data generated at block 320 may comprise document structure data indicating a section (e.g., a page, a section, a chapter, etc.) within a document that is associated with any text data. Feature data generated at block 320 may comprise text characteristic data, for example indicating a font, a style, a size, and/or an orientation associated with any text data.

At block 322, in some embodiments, the system may store the data generated at block 320 (e.g., word-level tokens with location information and other features) in any suitable format, for example in CSV format. The data may be stored in any suitable computer storage system locally and/or remotely.

In the second portion 330 of two-part pipeline 300, the following steps may be applied. Semantic, document, structural, and/or morphological information may be utilized, separately and/or together, as inputs. The method may include weak supervised learning in which the label for the documents does not need to be purely correct. This method may be robust in handling incorrect label information. A user may only needs to provide their domain knowledge, and the system may automatically label documents word-by-word using fuzzy matching. Based on this weak labeling method, the system can correct some errors from the text recognition during the training process. With the efficient design of the model, the systems described herein enable strong abilities to extract information from unseen documents in the same domain.

In some embodiments, in the second portion 330 of the two-part pipeline 300, steps 332-338 as described below may be applied.

At block 332, in some embodiments, the system may access stored data generated by the first portion 310 of pipeline 300. In some embodiments, the accessed data may be the same data (or a portion thereof, and/or data based thereon) that was stored at block 322.

At block 334, in some embodiments, the system may apply one or more feature engineering processes to the data generated at block 332 in order select features to be used to generate feature data. The feature engineering process may select features such as character, word (e.g., with more than one character), length of word, surrounding environment (e.g., next to a border (which could come from a table)), etc. During the training process, block 334 may be applied in order to determine which features to use to train the model. During subsequent application of the model, after training has been completed, block 334 may simply entail extracting the features that have been previously identified by the feature engineering process during training, and using those extracted features to generate feature data to be processed and analyzed by the trained model.

At block 336, in some embodiments, the system may apply labels and perform user-defined feature engineering in order select features to be used to generate feature data. During the training process, block 336 may be applied in order to determine which labels to apply to train the model and which features to use to train the model. During subsequent application of the model, after training has been completed, block 336 may simply entail extracting the features that have been previously identified by the feature engineering process during training, and using those extracted features to generate feature data to be processed and analyzed by the trained model.

In applying labels, the system may utilize domain knowledge, for example relying on one or more domain knowledge sources such as dictionaries or third-party data source. Domain knowledge may include known patterns that associate certain content types (e.g., page numbers) with certain spatial locations (e.g., the top of the page or the bottom of the page). During training, the system may label all tokens (e.g., characters, words, etc.), even if a confidence level in the accuracy of all labels is less than 100%. In performing labeling during training, the system may seek to achieve high recall (e.g., covering target entities as much as possible) and high precision (e.g., by mislabeling tokens as little as possible).

In performing user-defined feature engineering during training, the system may apply one or more feature engineering processes that leverage user input, in order to select features to use to generate feature data based on the user's domain knowledge. Leveraging user domain knowledge in order to select features to use to generate feature data for training may improve model quality and may improve model performance during implementation. The system may receive one or more user inputs indicating one or more of: section heading, customer name, customer address, date, billing address, shipping address, etc.

At block 338, in some embodiments, the system may generate, configure, and/or apply a knowledge-based deep-learning model using the feature data generated at block 320, 334, and/or 336. During training, the system may generate and configure the model based on the features selected for training. During application, the system may apply the trained model in order to generate output data indicating information extracted from analyzed input data (e.g., input documents), classifications for input data, and/or confidence levels associated with model outputs. The knowledge-based deep learning model may be a deep learning model that was trained using feature data generated based on the features selected at blocks 320, 334, and/or 336 during training. The deep-learning model(s) may generate output data that indicate one or more pieces of recognized content of the input documents, optionally along with associated confidence scores. The deep-learning model(s) may generate output data that classified the input documents into one or more classifications, optionally along with associated confidence scores. The output data may, for example indicate original token (e.g., location, words), basic features, and/or user defined features.

By applying deep-learning-based text detection and text recognition instead of (or in addition to) OCR engines, systems and methods disclosed herein may be more flexible in being able to be applied in different scenarios, and they may offer more control and customizability for the output of text recognition and detection.

In some embodiments, labels generated from the trained model may be used for further training of the model.

In some embodiments, the systems and methods disclosed herein may apply one or more of classical syntactic, semantic, and/or morphological analysis of documents to extract templates and weak labels.

In some embodiments, the systems and methods disclosed herein may include a customized loss function that may accelerate the model's convergence.

In some embodiments, the systems and methods disclosed herein may include one or more customized layers that leverage NLP embedding to allow the model to learn both content information and related location information.

In some embodiments, the systems and methods disclosed herein may leverage morphology as a part of feature engineering to improve performance on predicting word groups.

In some embodiments, the systems and methods disclosed herein may include one or more adaptive feeding methods for model training (e.g., feed model with 10 PDFs with distinct format for one step).

Regarding Deep Learning based OCR (DeepOCR), three approaches may be used: text detection, text recognition, and end-to-end combination of the two.

If targeting on finding information in images, text detection may be used to tell which parts in an image are likely to be text, and then a recognition model may be used model to tell content information in those parts of the image. Using two deep learning models may make a pipeline slow but more durable to customize on intermediate output. Alternately, an end-to-end solution may be used to directly recognize what is the text and where it is. This is only one deep learning model, and the inference speed thus be faster than a pipeline using two deep learning models.

In some embodiments, steps applied by the pipeline may be as follows. As a first step, as part of OCR feature engineering, OCR supplementation and line-labeling may be applied. This may include performing initial text detection, performing missing value supplementation, and detecting lines.

As a second step, as part of OCR feature engineering, word group segmentation, cluster segmentation, and structural segmentation may be applied.

As a third step, as part of OCR feature engineering, OCR feature engineering (structural) may be performed. Word-level features may include word coordinates, word heights (font size), word size, count upper/lower characteristics, and/or line label. Word-group-level features may include word-group coordinates, count of words, count of strings/digits, total white space, and/or word cluster label. Word-cluster-level features may include word-cluster coordinates, count of words, count of word groups, total white space, and/or count of lines. Word-structure-level features may include word structure coordinates, count of words/word groups, count of word clusters, total white space, and/or count of lines. An output, such as a CSV output, may be generated with related coordinates and other structural information. Using morphology as a part of feature engineering may improve performance on predicting word groups.

As a fourth step, as part of entity extraction, weak labeling for knowledge model training may be applied.

Figure 4:
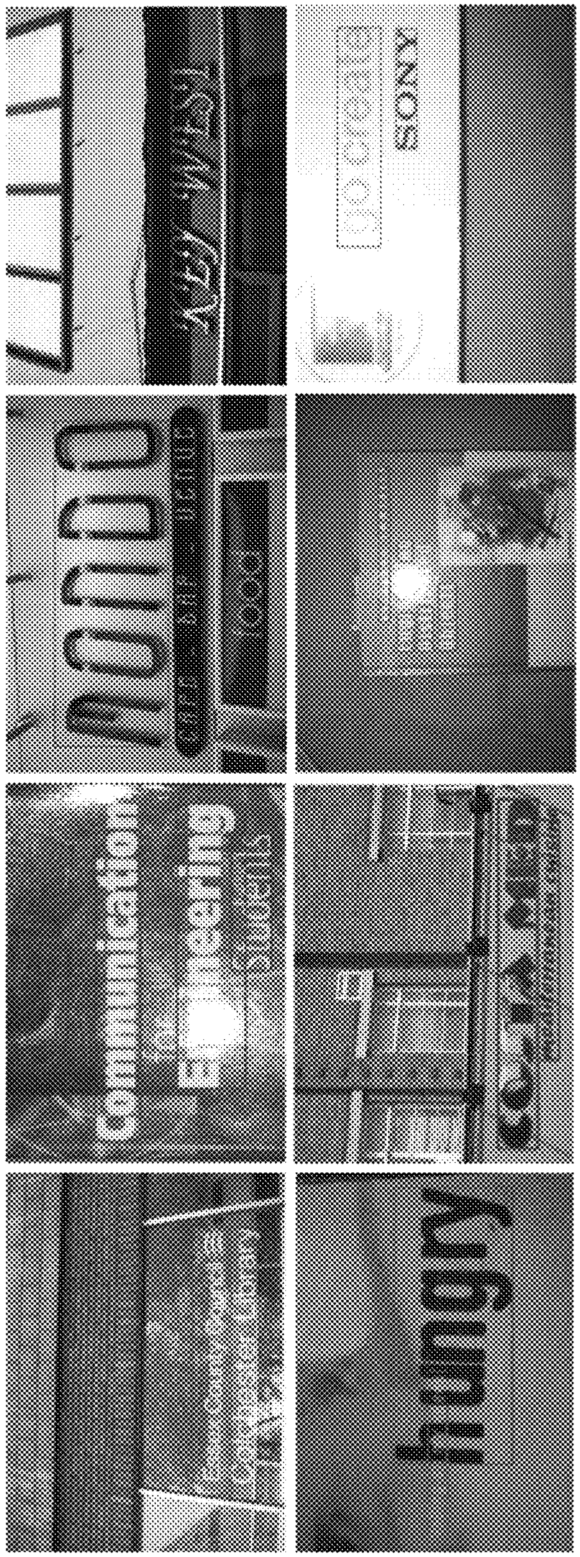
FIG. 4 shows samples of ICDAR13 images, in accordance with some embodiments.

In some embodiments, the model architecture may utilize semantic information, structure information, and/or morphology information. The model may include a customized network including an input layer, a body part, and a prediction part. The input layer may include (a) merged embedding and feature engineering and/or (b) variant batch size and sliding windows. The body part may include (a) fully dense layers and/or (b) customized penalization. The prediction may include customized metrics to monitor. Customized layers with NLP embedding may allow the model to learn both content information and related location information. The model may apply a sliding window from left to right. The model may leverage structure-enabled training. In terms of deep learning based computer vision, DeepOCR models target scenarios that are more inconsistent and noisy rather than normal OCR engines targeting specific cases such as well-scanned or printed documentation. Three main datasets were sourced for either training and testing, which are: ICDAR13, ICDAR15, and ICDAR17. Scenarios in these images are mostly scene text. Some samples of ICDAR13 images are shown in FIG. 4.

Figure 5:
FIG. 5 shows samples of ICDAR2015 images, in accordance with some embodiments.

Some samples of ICDAR2015 images are shown in FIG. 5.

Comparing the two solutions described above, the combined solution (text detection+text recognition) processed slowly, but was agile for customization depending on the separated architecture. The second end-to-end solution was faster, but the performance is relatively low. Details are shown below in Table 2, showing a comparison of top scores.

TABLE 2

| | ICDAR2013 | ICDAR2015 |
|---|---|---|
| End-to-End | 0.8477 (F1) | 0.6533 (F1) |
| Text Detection | 0.952 (F1) | 0.869 (F1) |
| Text Recognition | 0.95 (Acc) | 0.933 (Acc) |

Figure 6:
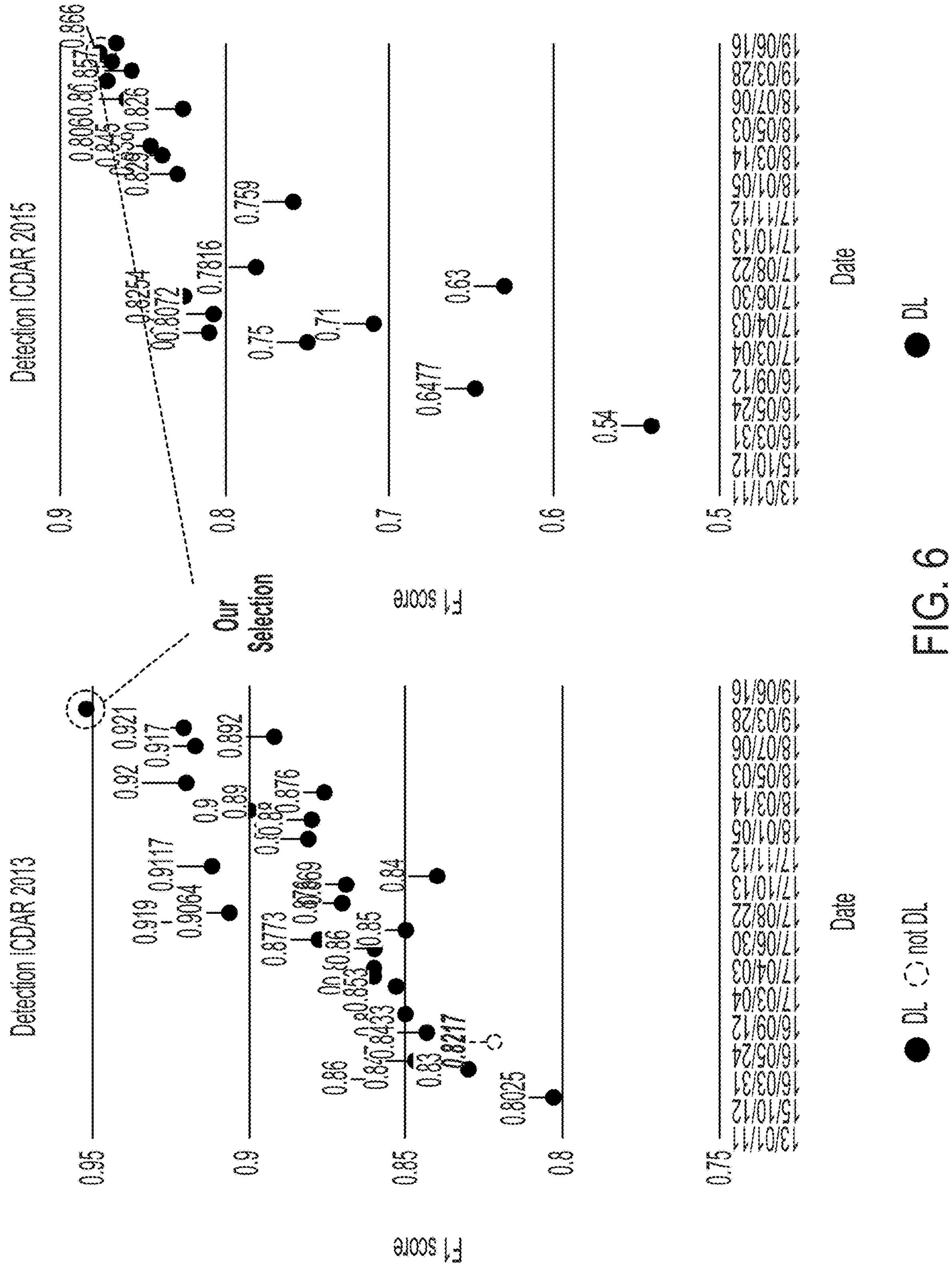
FIG. 6 shows a comparison of text models, in accordance with some embodiments.

Among models in the first solution, the model from Clova was selected as a base model. As shown in FIG. 6, comparing text detection models, the performance of the model from Clova was competitive, and the predictions were more flexible.

Using mostly scanned images, OCR engines (ABBYY) output the word group. Examples are shown in FIG. 7, showing a comparison between DeepOCR and OCR Engine.

Figure 8:
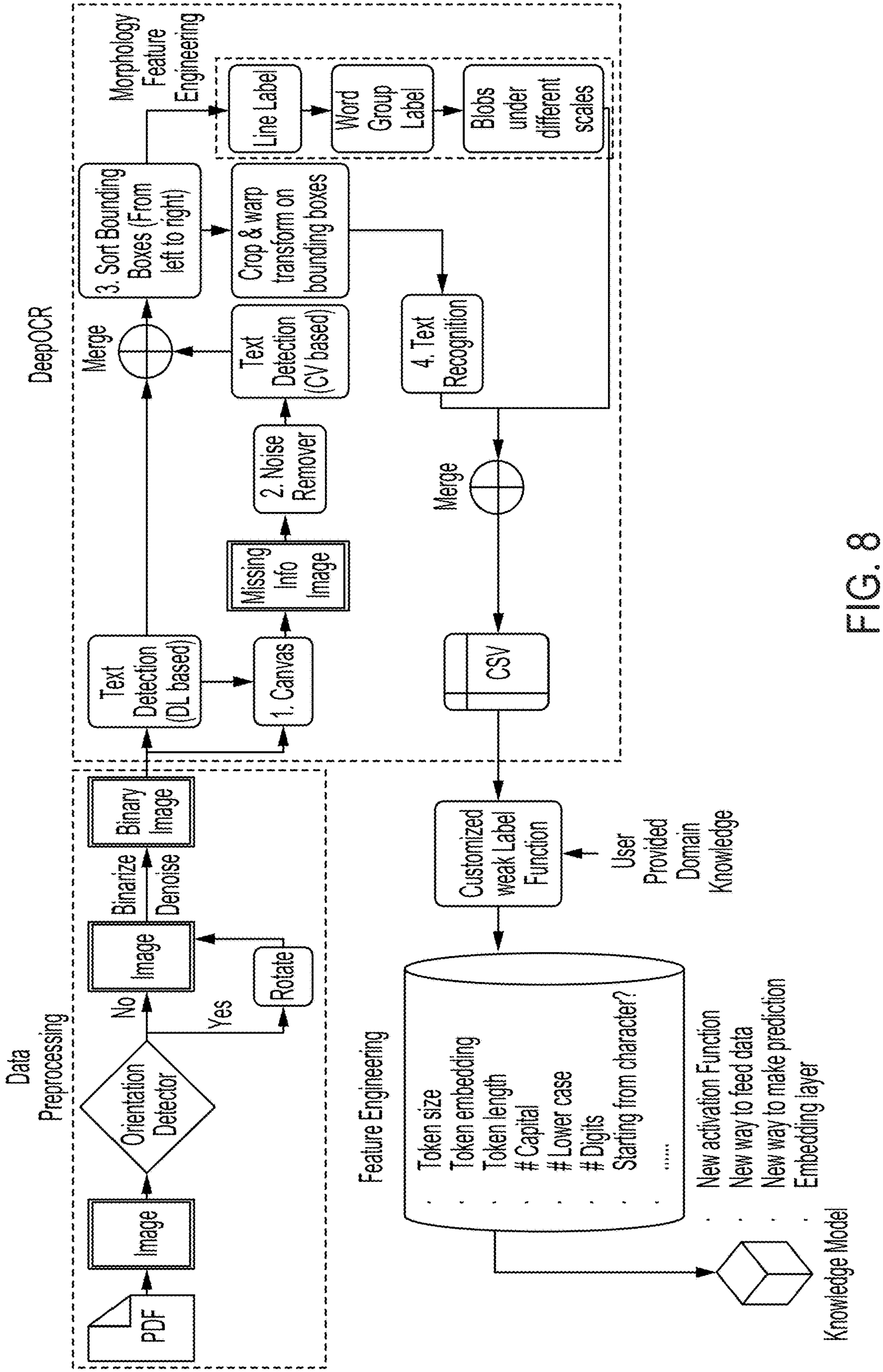
FIG. 8 shows a schematic diagram of a two-part pipeline for knowledge-based information extraction from richly formatted digital documentation, in accordance with some embodiments.

FIG. 8 depicts a schematic diagram of a two-part pipeline for knowledge-based information extraction from richly formatted digital documentation, in accordance with some embodiments. In some embodiments, the pipeline shown in FIG. 8 may share any one or more characteristics in common with pipeline 300 shown in FIG. 3 above and/or with any other embodiments described herein. Described herein are characteristics of such pipelines for knowledge-based information extraction from richly formatted digital documentation, in accordance with some embodiments.

Figure 9:
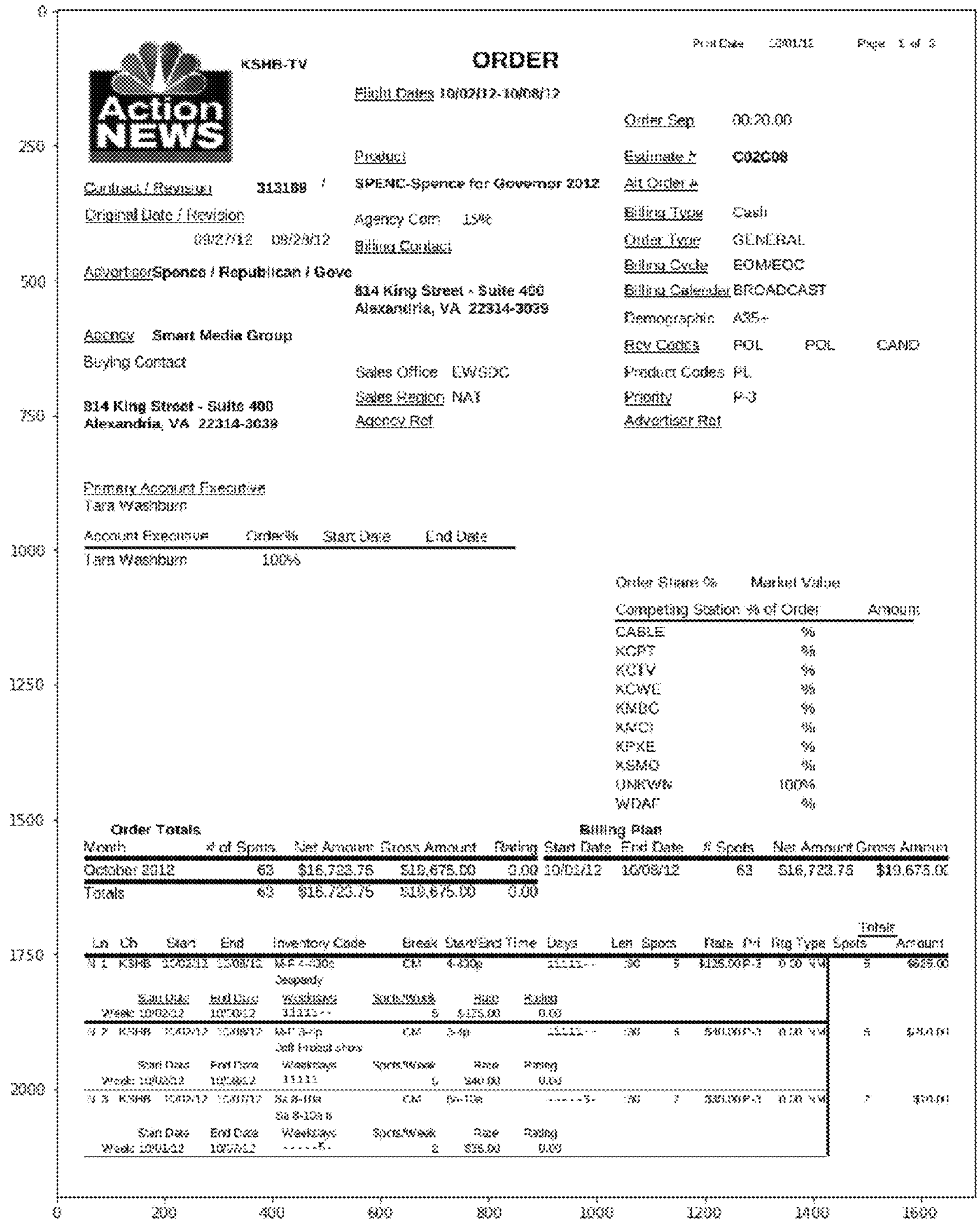
FIGS. 9-18 show images of a PDF document as processed by techniques disclosed herein, in accordance with some embodiments.

FIG. 9 shows a first page of a PDF document, which may serve as an input into the pipeline of FIG. 8.

Figure 10:
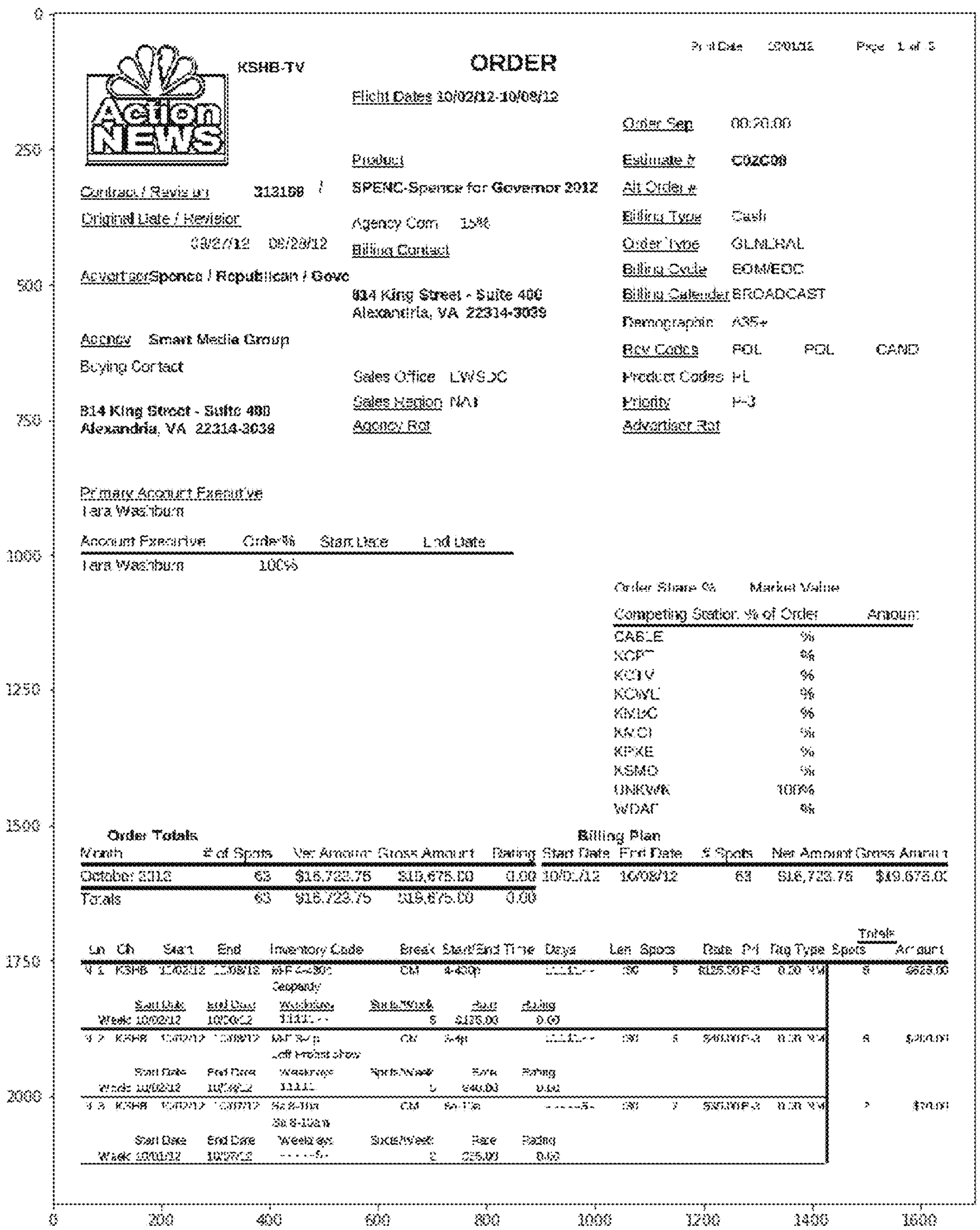

FIG. 10 shows the result of the input PDF page being subject to a denoising operation and then binarized as an image.

Figure 11:
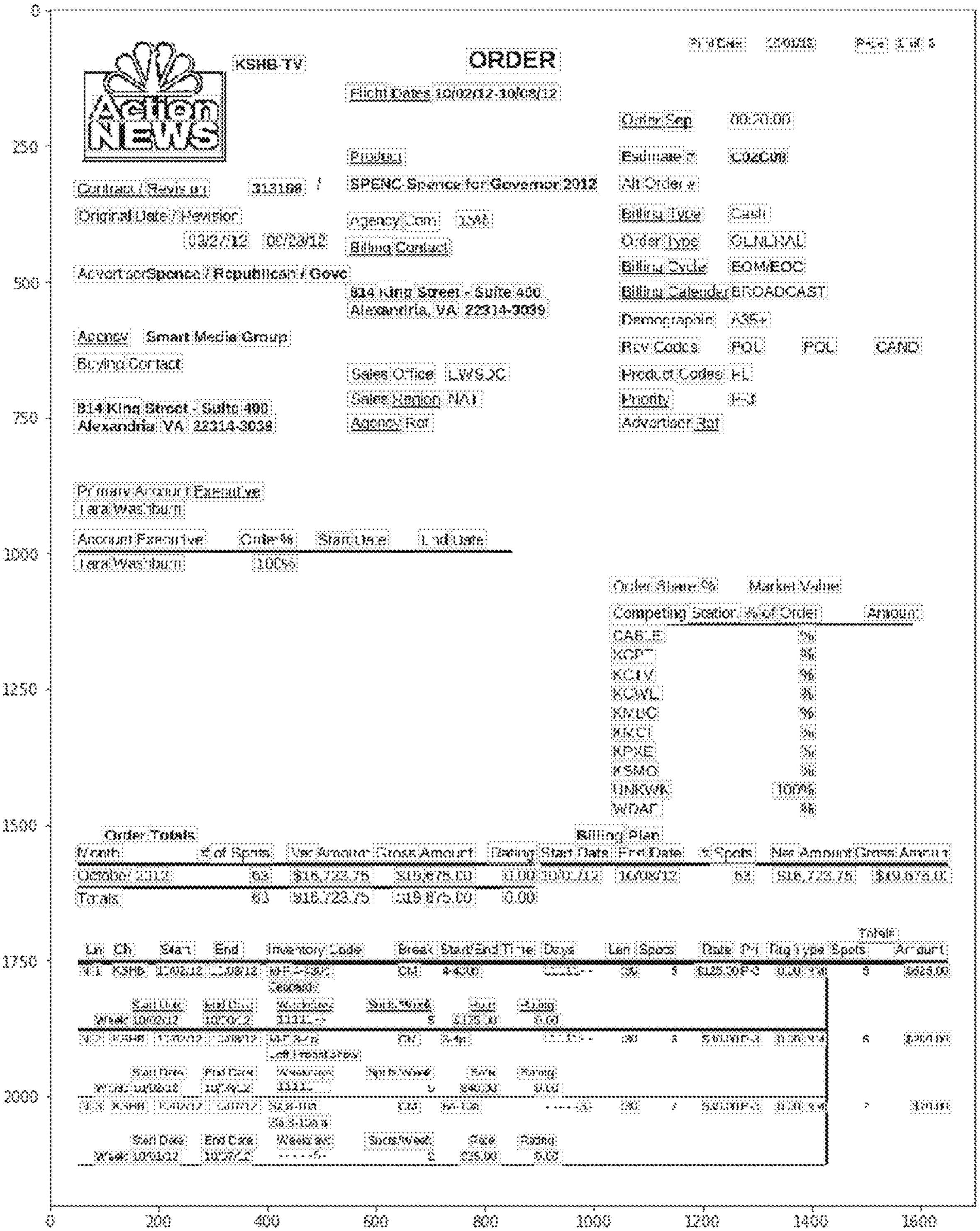
Figure 12:
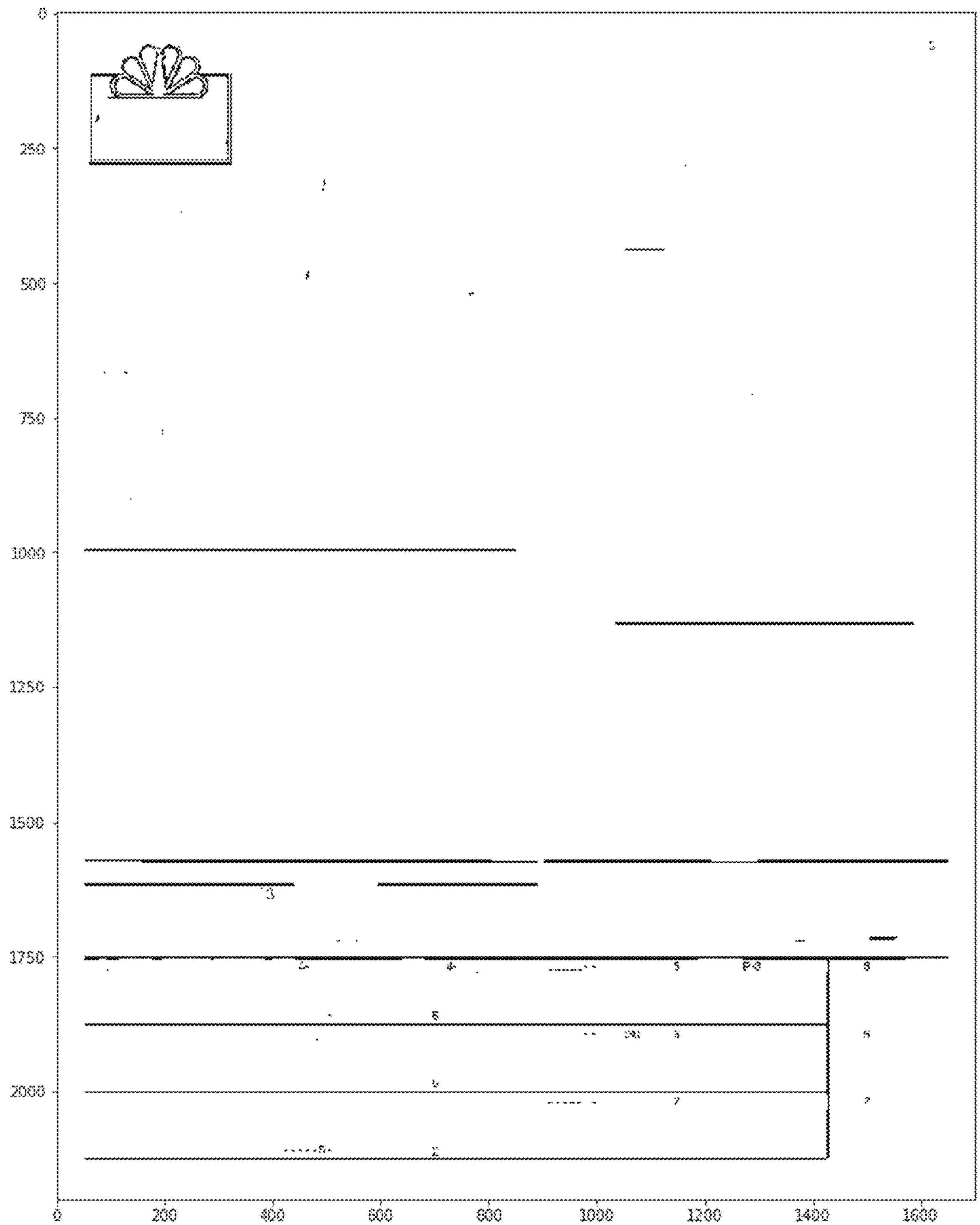

After denoising and binarizing as an image, a text detection model may be applied. FIG. 11 shows bounding boxes, which may bound a word level, applied by a text detection model. In applying the text detection model, the function may be: detection_net. In applying the, the following customizations may be available:

trained_model: pretrained model for text detection
text_threshold: confidence threshold for detecting the text
low_text: text low-bound score
link_threshold: link confidence threshold
cuda: use cuda for inference (default: True)
canvas_size: max image size for inference
mag_ratio: image magnification ratio
poly: enable polygon type result
show_time: show processing time
test_folder: folder path to input images
refine: use link refiner for sentense-level dataset
refiner_model: pretrained refiner model After the text detection model is applied, missing information may be supplemented, for example using 'Canvas.' FIG. 12 shows how detected text may be covered by white boxes.

Figure 13:
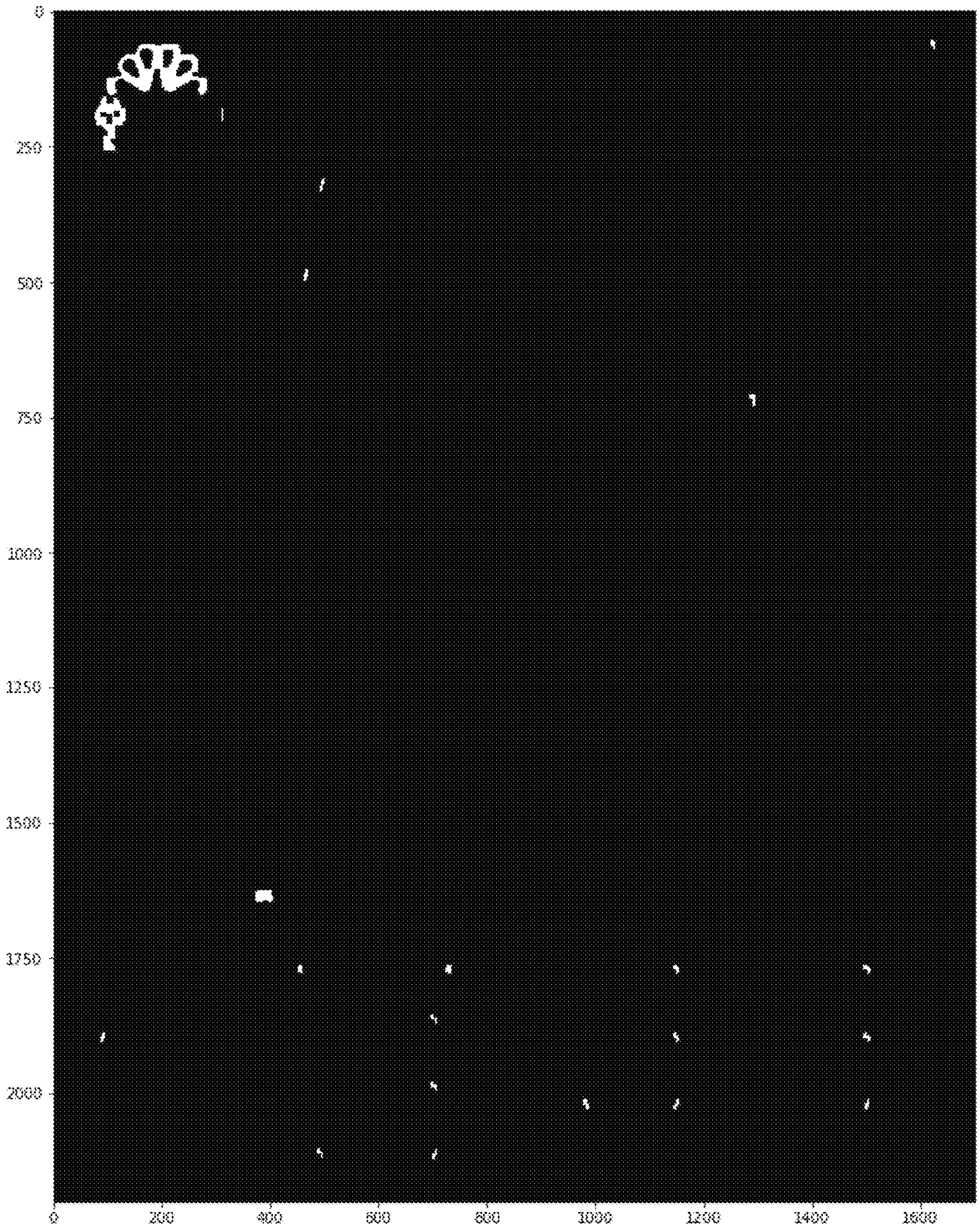

FIG. 13 shows how lines, dashes, and other noise may then be removed to keep only the missing information (shown in FIG. 13 as white patches).

Figure 14:
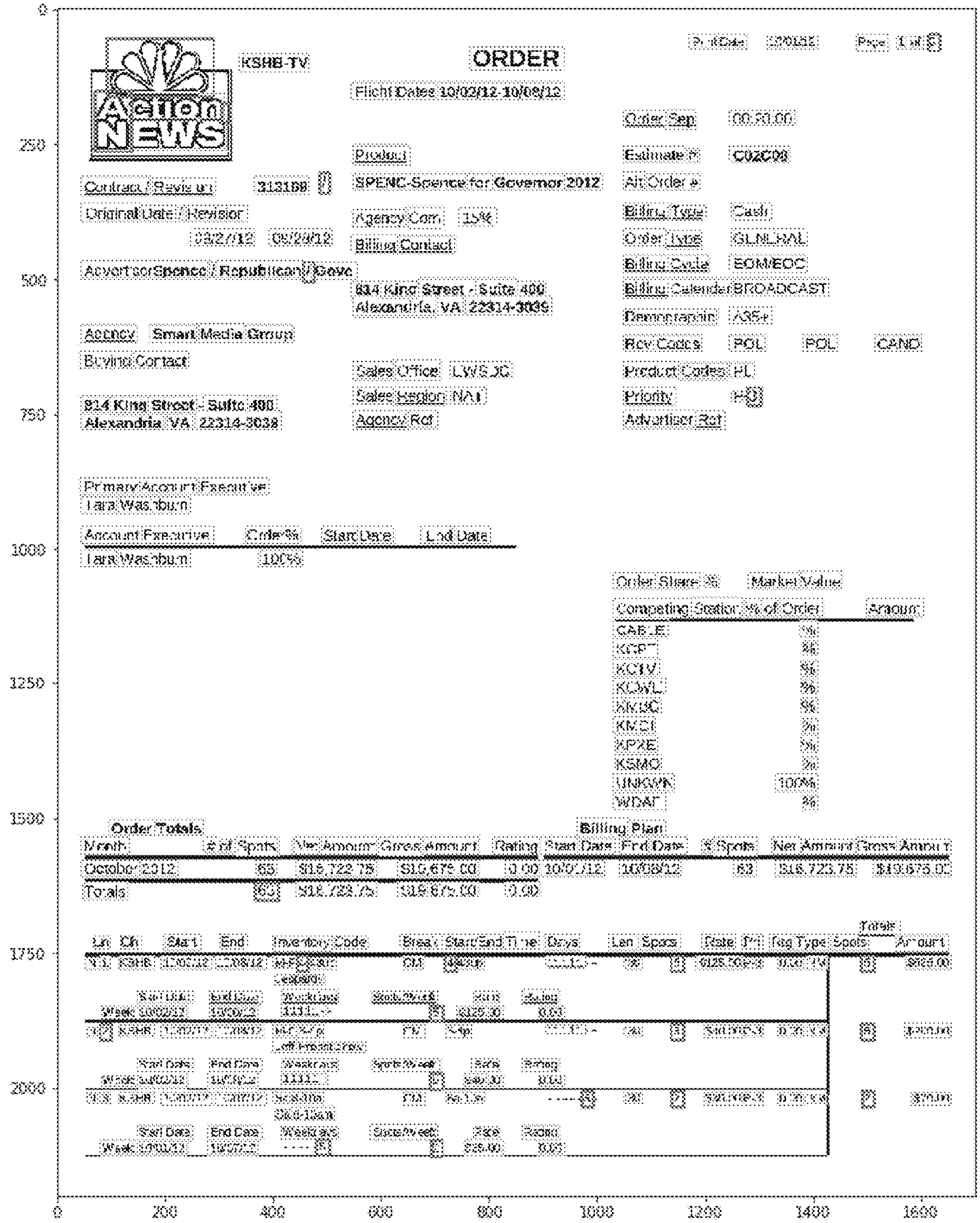

FIG. 14 shows how the identified white patches indicating missing information may be supplemented into the text detection results, with additional bounding-boxes (as compared to those from FIG. 11) showing the supplemented information.

Figure 15:
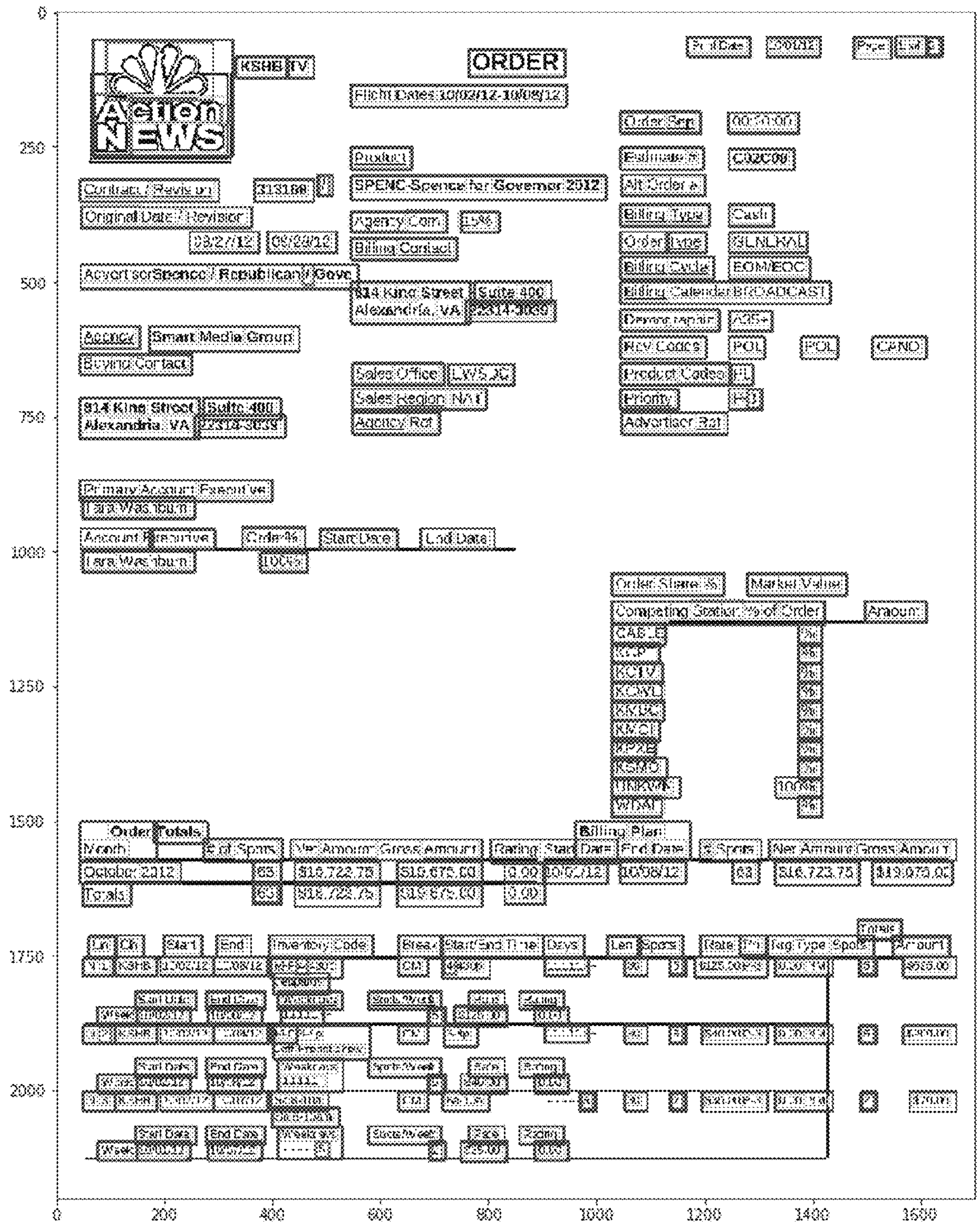

The system may then analyze different orientations and sizes of detected "blobs," based on morphology (e.g., word group, paragraph, parts, etc.). As shown by the additional bounding boxes in FIG. 15 (as compared to those from FIGS. 11 and 14), horizontal "blobs" may be identified as word groups.

Figure 16:
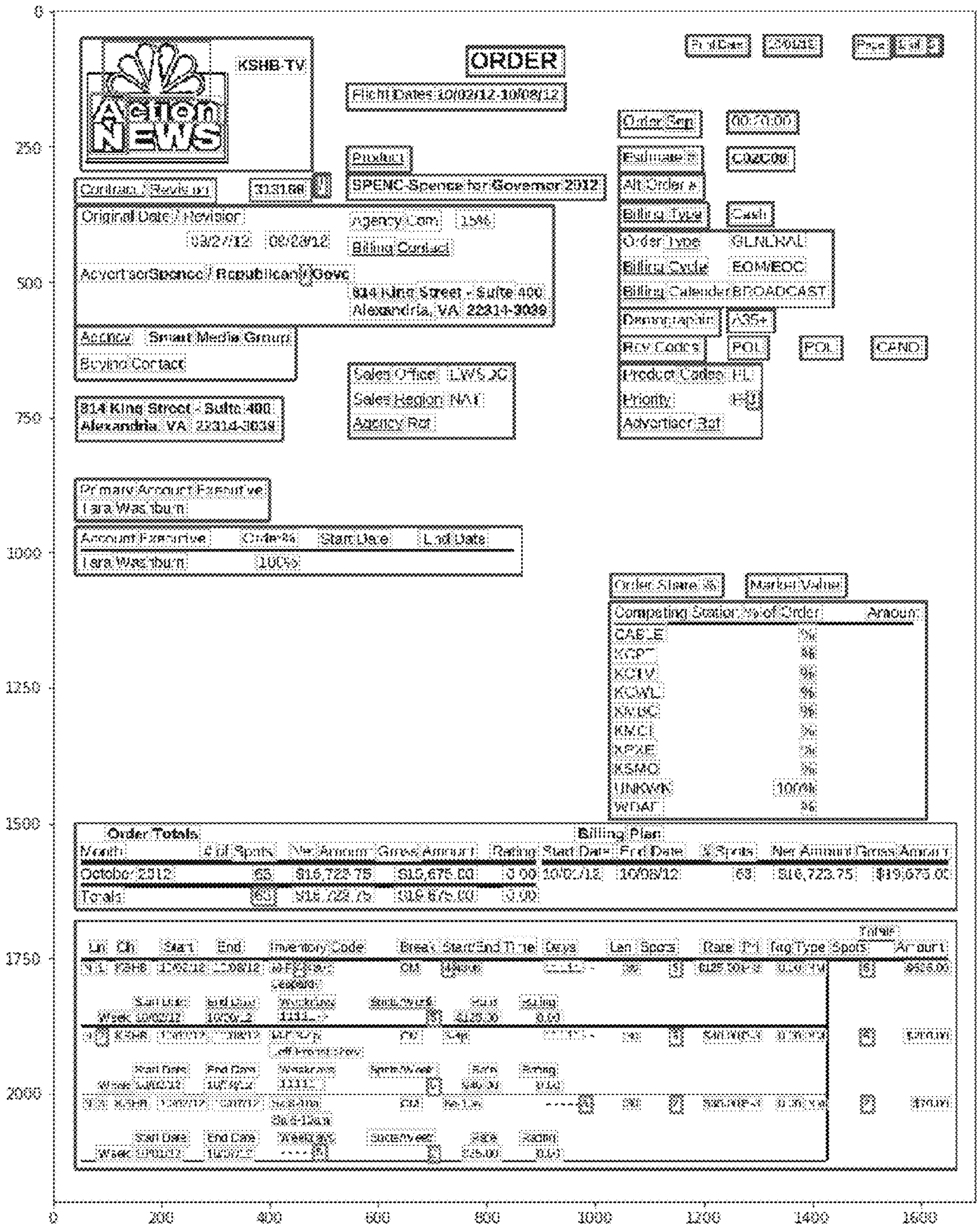

As shown by the additional bounding boxes in FIG. 16 (as compared to those from FIGS. 11 and 14), larger "blobs" (e.g., as compared to others on the same page, others in the same document, others in the same document bundle, and/or as compared based on prior training of the system) may be identified as paragraphs and/or as sections with obvious distance.

Figure 17:
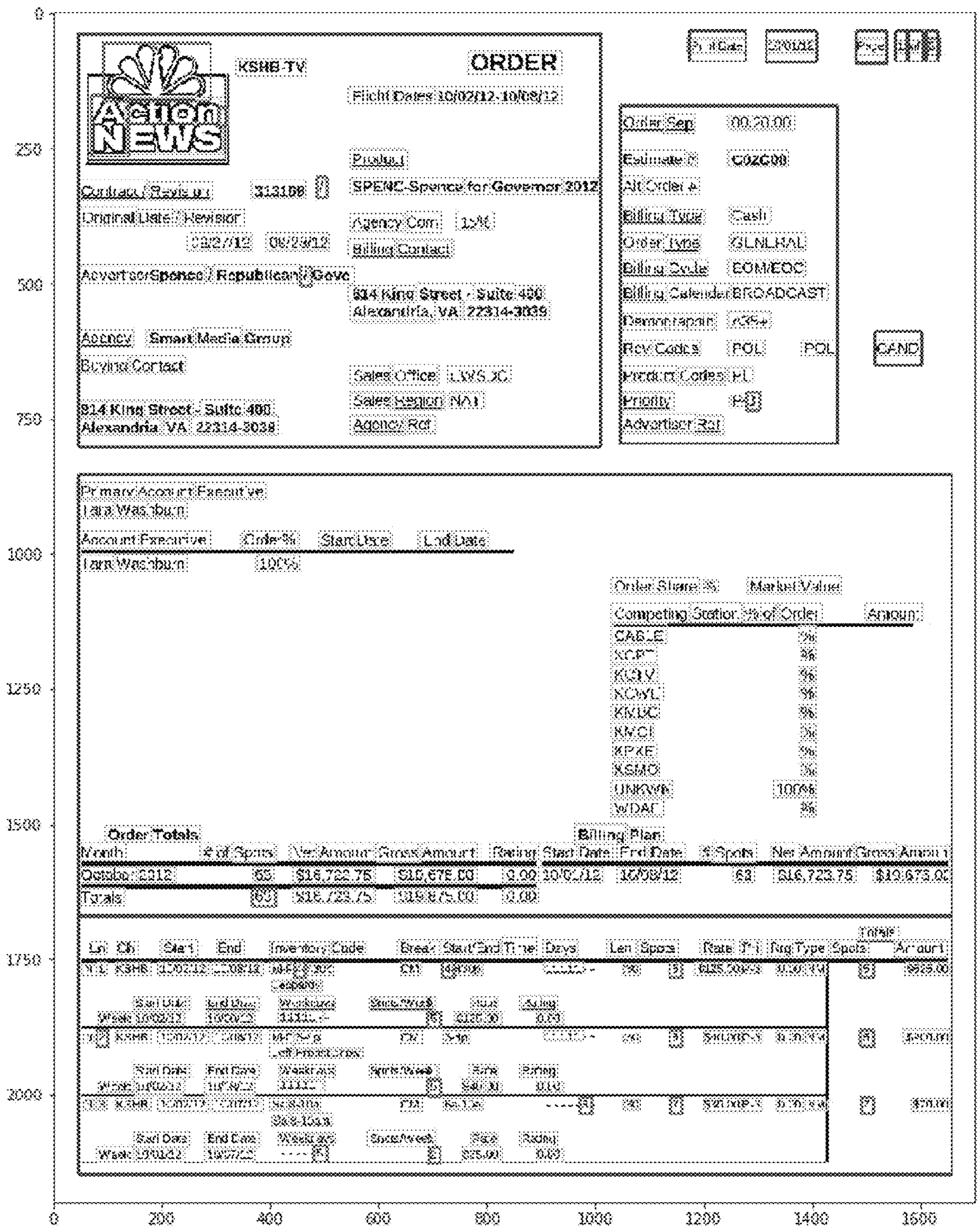

As shown by the additional bounding boxes in FIG. 17 (as compared to those from FIGS. 11 and 14), the largest "blobs" (e.g., as compared to others on the same page, others in the same document, others in the same document bundle, and/or as compared based on prior training of the system) may be identified as indicative of structural segmentation of the document. In FIG. 17, in some embodiments, the additional bounding boxes correspond to the blobs that may be indicative of structural segmentation of the document. Identification of paragraphs as shown in FIG. 16 and identification of structural segmentation as shown in FIG. 17 may be carried out using different "blob" size thresholds. In some embodiments, information regarding structural segmentation of documents may be used to feed the network.

Figure 18:
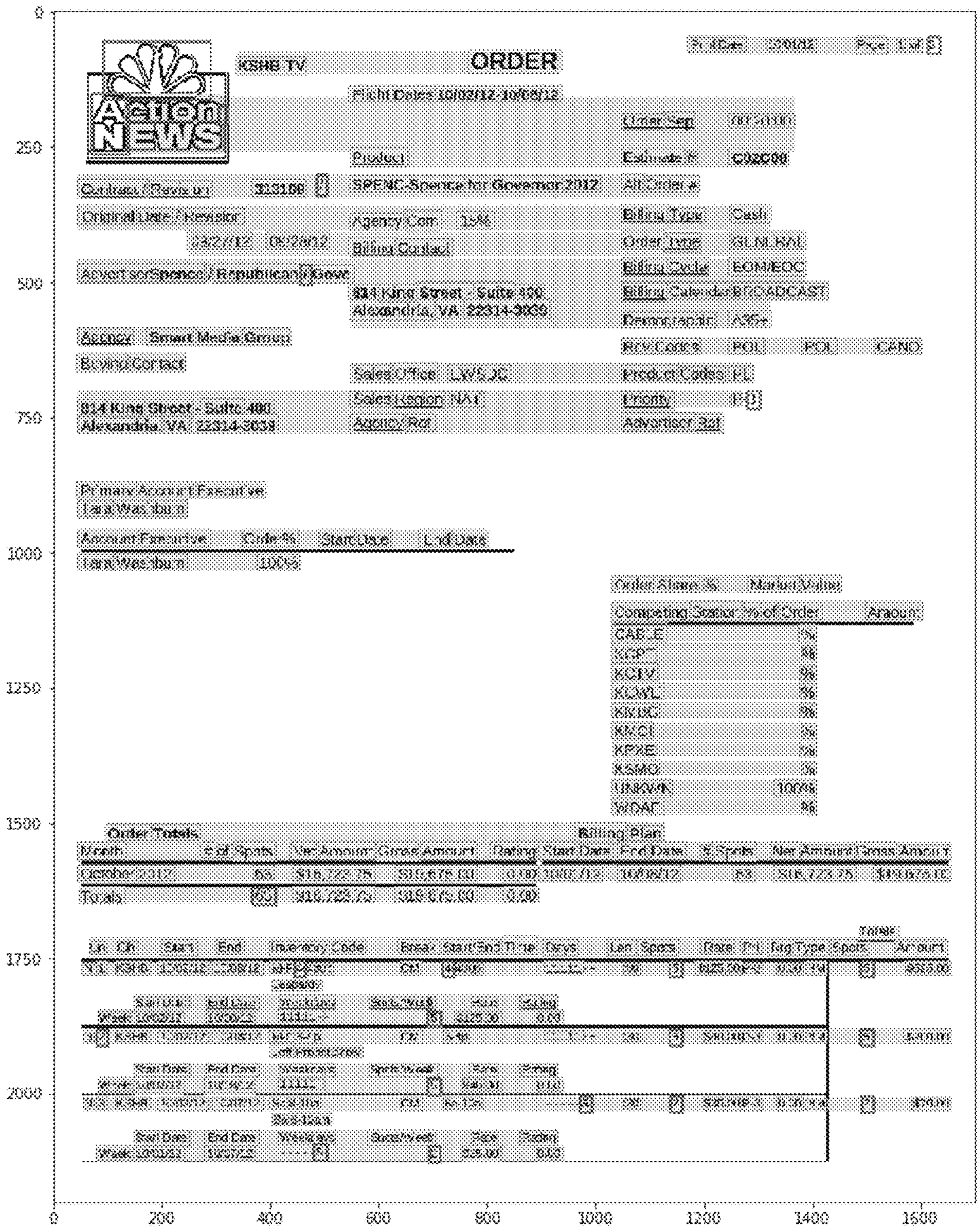

The system may then, in some embodiments, sort words ordered from left to right, and may determine line labels, as shown for example in FIG. 18. With respect to how structural information may influence performance, "blobs" with different scales may not only be used for feature engineering but may also be used for inference correction. Thus, the model may use, for example, word-group-level "blobs" and line information to localize which entity a predicted word is located in.

The system may then apply one or more text recognition algorithms on each bounding box and may thereby generate output data, for example by generating a CSV file with line and word group information for each token, as shown for example in FIG. 19.

Data included in the output, as shown in FIG. 19, may include one or more of the following:

Slug: name of the document
Page: the page that the token belongs to
X0,y0: coordinates of the top left corner of the bounding box
X1,y1: coordinates of the bottom right corner of the bounding box
Rel_x0, rel_y0, rel_x1, rel_y1: relative coordinates; coordinates adjusted by the size of the document
Token: word identified by the text detection algorithm
Line_label: which line the token locates in the document
Word_group_label: generated by horizontal blobs (used for identify word group)

The system may then utilize domain knowledge information, for example as received via one or more user inputs from a user of the system, to label the dataset. This may be referred to as a "weak label function." The system may create annotations that may be validated by one or more users and may be used to train computer vision models that can extract information, thus allowing bootstrapping with little or no labeled data.

For example, a user may want to extract data regarding committee names from documents, and the user's domain knowledge may include that 'JONES FOR SENATE' is a committee name. After the user inputs this information into the solution, the system may scan all the training documents and label the words identified by the DeepOCR. For example, DeepOCR output for the document may be "For instance, the 'JONES FOR SENATE' is a committee name. Then the CSV file may be labeled as shown in FIG. 20.

In this example, the solution correctly labeled the committee name (in the lines including the words "JONES", "FOR", and "SENATE") and also incorrectly labeled the first instance of the word "For" as a part of the committee name. This demonstrates the weak label function that may generate some errors in the label column. In weak labeling, true labels may be interspersed with incorrect labels as noise; this noise may not damage the model performance significantly if the recall is high enough. Thus, it may be used in the systems described herein, with appropriate configurations as described herein, to label data.

The system may be configured to perform feature engineering, for example as follows for the example image shown in FIG. 21.

Length_words: How many characters in this token; 16 characters.
Word_size: the area of the bounding box; (x1-x0)*(y1-y0)
Relative_location: the order of the word; start from top left to bottom right
Num_upper_chars: number of upper characters; 14 upper characters
Title_word: tile word or not
Relative_word_size: word size over the maximum word size in the same page
Max_word_size: maximum word size in the page.
Max_word_size_page: maximum word size in the page over the maximum word size in the document.
Num_words_in_page: number of words in the page
X0_min: the minimum value of x0 in the page
X1_max: the maximum value of x1 in the page.
Y0_min: the minimum value of the y0 in the page
Y1_max: the maximum value of y1 in the page
Line_label_max: the number of lines in the page The system may apply one or more knowledge models. The system may apply an activation function, for example a self-regularized non-monotonic neural activation function. The derivative of the activation function used by the system may be smoother than Relu, which may improve the rate of convergence.

In order to make sure the distribution of the label is stable, variational batch size may be used to train the model, which can ensure the model is trained with the same amount of documents in each batch. This may reduce the risk of gradient explosion.

In some embodiments, an embedding layer of the network may be constructed with the fasttext word embedding. This method may improve the rate of convergence and the accuracy rate of the model.

In some embodiments, the systems and methods described herein may offer superior performance as compared to named-entity recognition (NER) models.

Figure 22:
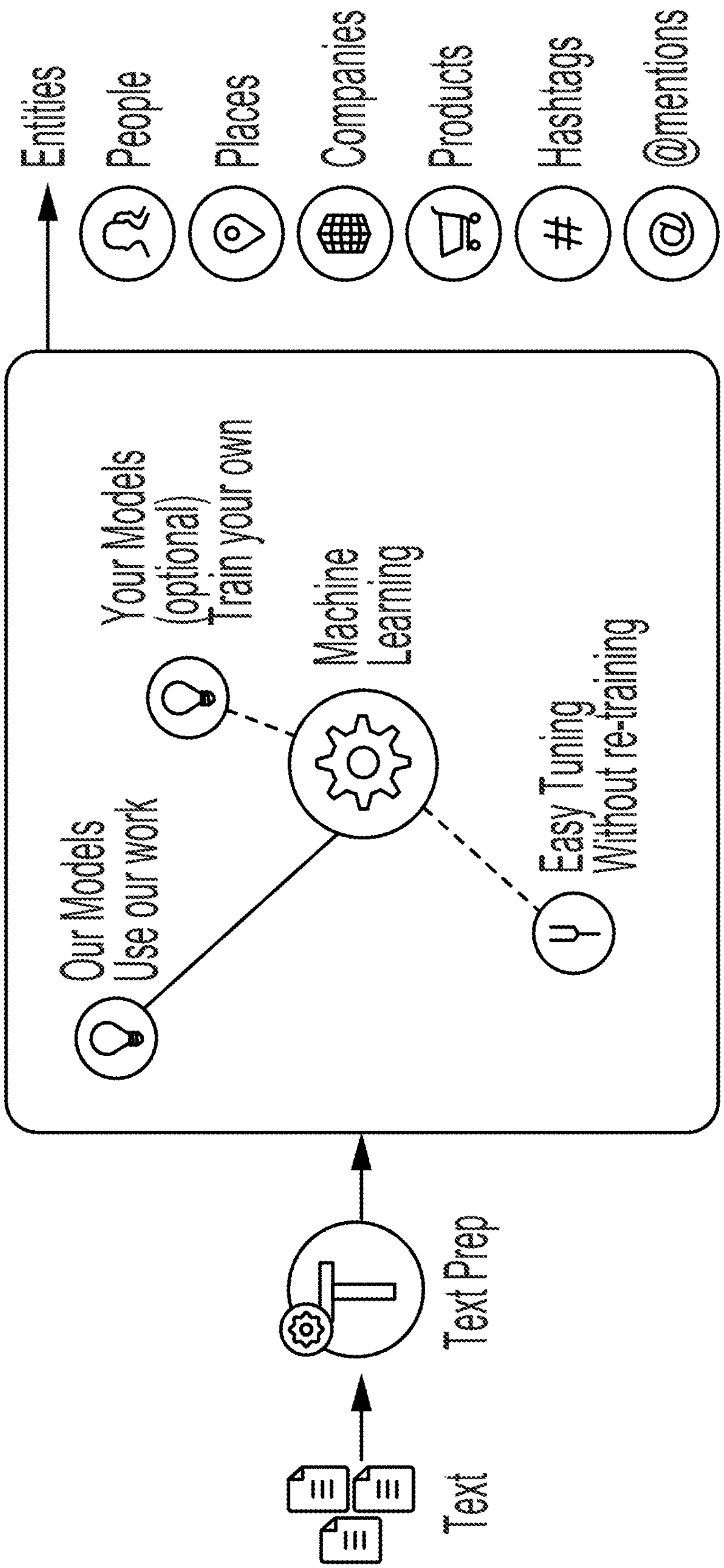
FIG. 22 shows an architecture for a named-entity recognition model, in accordance with some embodiments.

Named-entity recognition is a subtask of information extraction that seeks to locate and classify named entities mentioned in unstructured text into pre-defined categories such as person names, organizations, locations, medical codes, time expressions, quantities, monetary values, percentage, etc. FIG. 22 shows an architecture for a named-entity recognition model, in accordance with some embodiments.

Tools for NER, including Spacy, StanfordNLP, and Bert, were trained with a large number of documents. However, the major part for the documents that were used for said training are paragraphs, not word groups. This means the NER pretrained model may not be suitable for processing of all document types, such as richly formatted documents.

FIG. 23 shows output data from a named-entity recognition model, in accordance with some embodiments.

Figure 24:
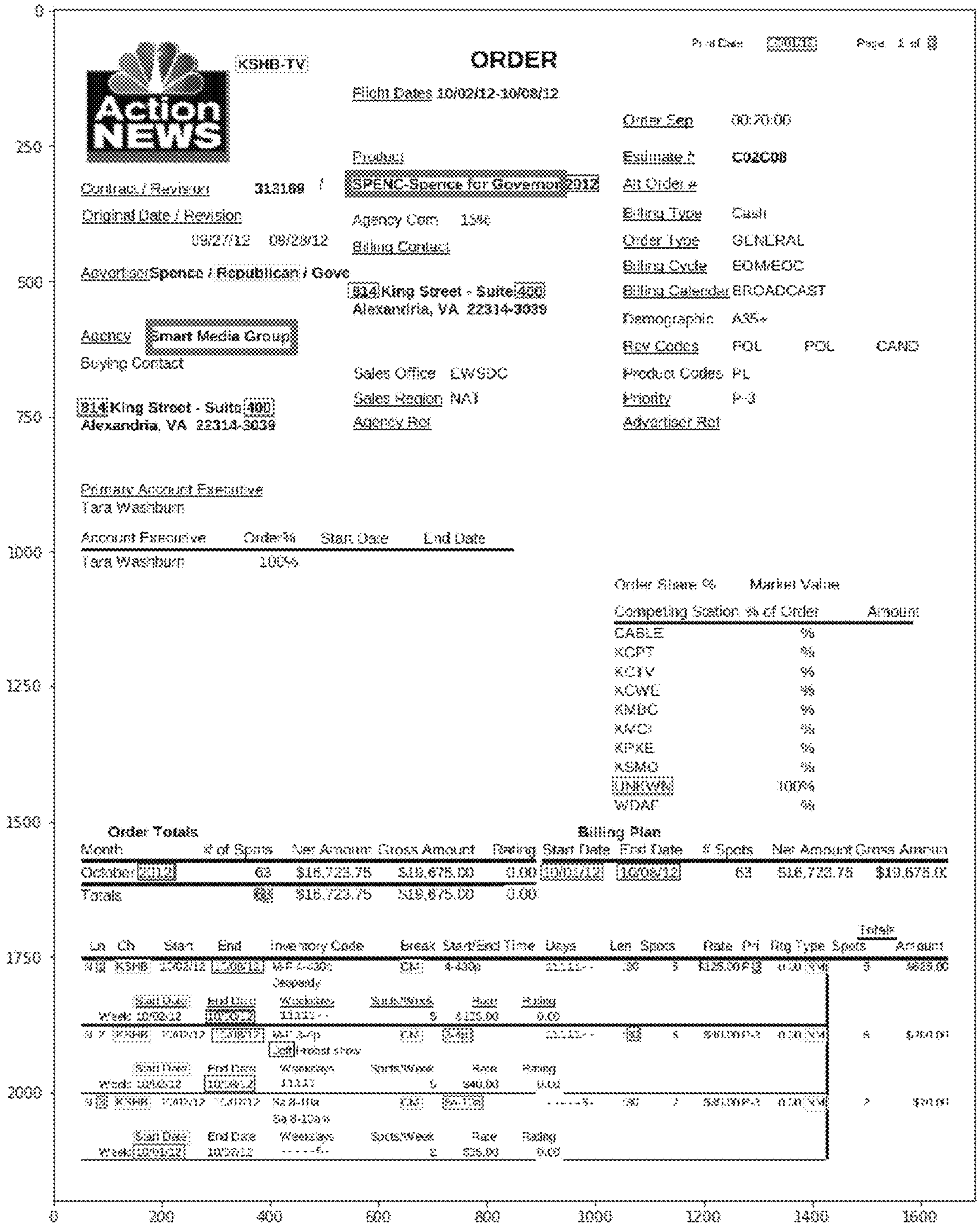
FIG. 24 shows results of processing a PDF using an NER model, in accordance with some embodiments.

A NER model was applied to the same testing data as described hereinabove, and different bounding boxes were used to annotate the named entities. Results are shown in FIG. 24, where different bounding box types (e.g., which may be displayed by a display system in different colors and may correspond to different stored metadata associated with the bounding box) may correspond to the following meanings:

'CARDINAL'
'ORG'
'DATE'
'LANGUAGE'
'GPE'
'PRODUCT'
'PERSON'
'Target Entities' (Ground Truth)

It was observed that the NER model did not detect the ground truth, 'Smart Media Group' and 'SPENC-Spence for Governor', which are an agency name and a committee, respectively.

Figure 25:
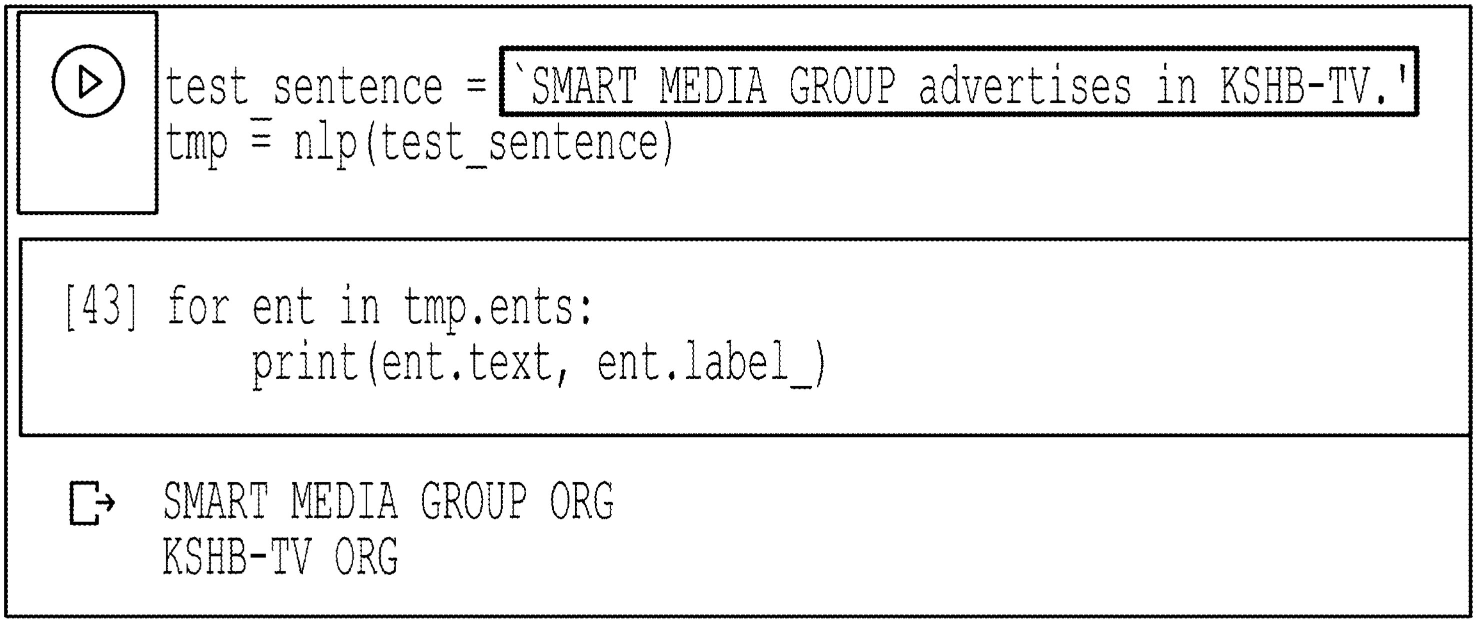
FIG. 25 shows the application of the NER model to a full sentence, in accordance with some embodiments.

But using the NER model on a full sentence like 'SMART MEDIA GROUP advertises in KSHB-TV.', the NER correctly recognizes the 'SMART MEDIA GROUP' as an Organization, as shown by the application of the NER model to the full sentence in FIG. 25.

Thus, for documents with paragraph structure, an NER model may be a good solution. However, for documents that are richly formatted and in which paragraphs are not a major part of the documents, NER models may have only limited applicability, and the other systems and methods described herein may offer improvements and advantages.

Computer

Figure 26:
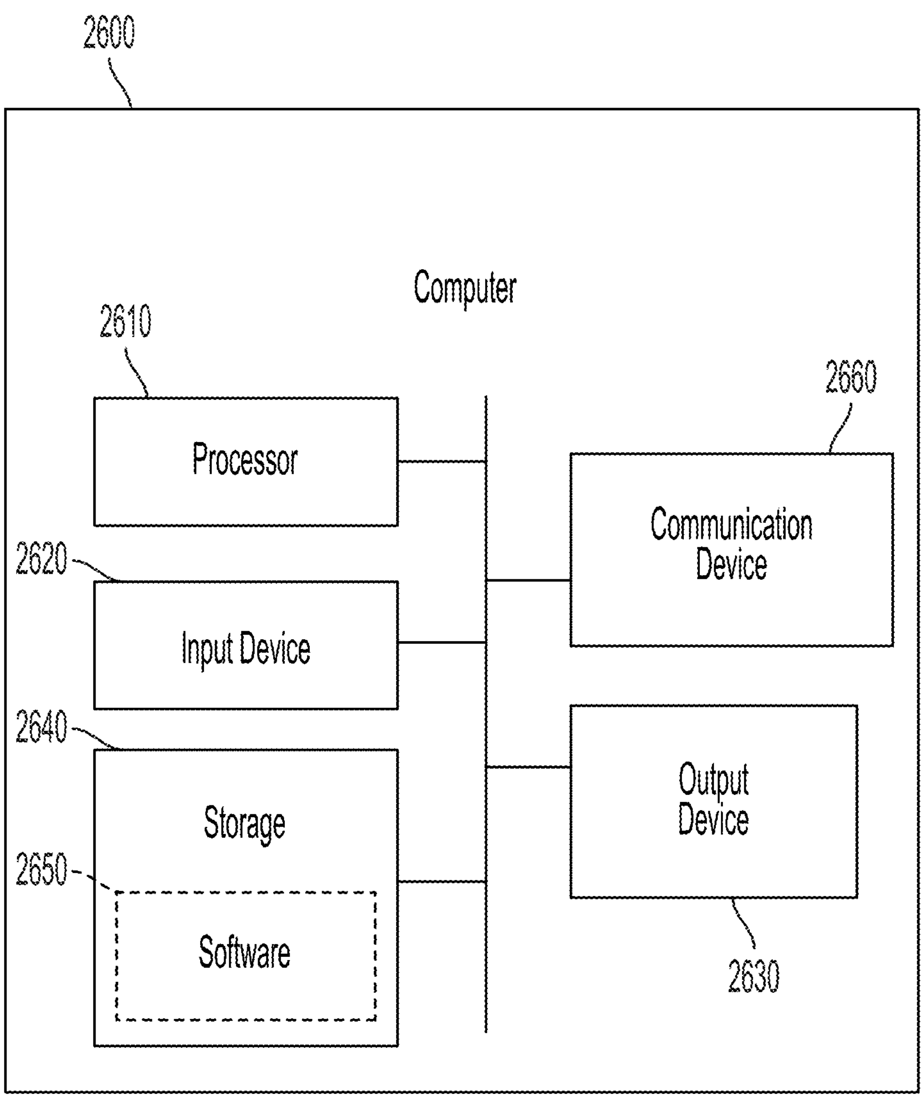
FIG. 26 depicts a computer, in accordance with some embodiments.

FIG. 26 illustrates an example of a computer, according to some embodiments. Computer 2600 can be a component of a system for providing an AI-augmented auditing platform including techniques for providing AI-explainability for processing data through multiple layers. In some embodiments, computer 2600 may execute any one or more of the methods described herein.

Computer 2600 can be a host computer connected to a network. Computer 2600 can be a client computer or a server. As shown in FIG. 26, computer 2600 can be any suitable type of microprocessor-based device, such as a personal computer, workstation, server, or handheld computing device, such as a phone or tablet. The computer can include, for example, one or more of processor 2610, input device 2620, output device 2630, storage 2640, and communication device 2660. Input device 2620 and output device 2630 can correspond to those described above and can either be connectable or integrated with the computer.

Input device 2620 can be any suitable device that provides input, such as a touch screen or monitor, keyboard, mouse, or voice-recognition device. Output device 2630 can be any suitable device that provides an output, such as a touch screen, monitor, printer, disk drive, or speaker.

Storage 2640 can be any suitable device that provides storage, such as an electrical, magnetic, or optical memory, including a random access memory (RAM), cache, hard drive, CD-ROM drive, tape drive, or removable storage disk. Communication device 2660 can include any suitable device capable of transmitting and receiving signals over a network, such as a network interface chip or card. The components of the computer can be connected in any suitable manner, such as via a physical bus or wirelessly. Storage 2640 can be a non-transitory computer-readable storage medium comprising one or more programs, which, when executed by one or more processors, such as processor 2610, cause the one or more processors to execute methods described herein.

Software 2650, which can be stored in storage 2640 and executed by processor 2610, can include, for example, the programming that embodies the functionality of the present disclosure (e.g., as embodied in the systems, computers, servers, and/or devices as described above). In some embodiments, software 2650 can include a combination of servers such as application servers and database servers.

Software 2650 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 2640, that can contain or store programming for use by or in connection with an instruction execution system, apparatus, or device.

Software 2650 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include but is not limited to, an electronic, magnetic, optical, electromagnetic, or infrared wired or wireless propagation medium.

Computer 2600 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 2600 can implement any operating system suitable for operating on the network. Software 2650 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

Following is a list of embodiments:

Embodiment 1. A system for determining the composition of document bundles, the system comprising one or more processors configured to cause the system to:
- receive data comprising a document bundle;
- extract, from the document bundle, first information comprising substantive content of one or more documents of the document bundle;
- extract, from the document bundle, second information comprising metadata associated with one or more documents of the document bundle; and
- generate, based on the first information and the second information, output data representing a composition of the document bundle.

Embodiment 2. The system of embodiment 1, wherein the output data representing a composition of the document bundle represents one or more delineations between page boundaries in the document bundle.

Embodiment 3. The system of embodiment 1-2, wherein generating the output data is further based on context information received from a data source separate from the document bundle.

Embodiment 4. The system of embodiment 3, wherein the context information comprises ERP data received from an ERP system of an entity associated with the document bundle.

Embodiment 5. The system of embodiment 3-4, wherein the context information comprises data specifying a predefined set of events associated with a process associated with the document bundle.

Embodiment 6. The system of embodiment 3-5, wherein the context information comprises data characterizing a request, wherein the data comprising the document bundle was received by the system in response to the request.

Embodiment 7. The system of embodiment 3-6, wherein the context information comprises data characterizing an automation process flow for acquiring the data.

Embodiment 8. The system of embodiment 1-7, wherein the metadata comprises one or more of: a file name, a file extension, a file creator, and a file date.

Embodiment 9. The system of embodiment 1-8, wherein extracting the first information comprises applying embedded object type detection.

Embodiment 10. The system of embodiment 1-9, wherein generating the output data comprises applying a page similarity assessment model to a plurality of pages of the document bundle.

Embodiment 11. The system of embodiment 1-10, wherein generating the output data comprises applying a finite state modeling data processing operation to the document bundle.

Embodiment 12. A non-transitory computer-readable storage medium storing instructions for determining the composition of document bundles, the instructions configured to be executed by one or more processors of a system to cause the system to:
- receive data comprising a document bundle;
- extract, from the document bundle, first information comprising substantive content of one or more documents of the document bundle;
- extract, from the document bundle, second information comprising metadata associated with one or more documents of the document bundle; and
- generate, based on the first information and the second information, output data representing a composition of the document bundle.

Embodiment 13. A method for determining the composition of document bundles, wherein the method is performed by a system comprising one or more processors, the method comprising:
- receiving data comprising a document bundle;
- extracting, from the document bundle, first information comprising substantive content of one or more documents of the document bundle;
- extracting, from the document bundle, second information comprising metadata associated with one or more documents of the document bundle; and
- generating, based on the first information and the second information, output data representing a composition of the document bundle.

Embodiment 14. A system for validating signatures in documents, the system comprising one or more processors configured to cause the system to:
- receive an electronic document comprising one or more signatures;
- apply one or more signature-extraction models to the electronic document to generate, for each of the one or more signatures in the electronic document, data representing a spatial location for the respective signature and a confidence level for the respective signature; and
- determine, based on the data representing the spatial location and the confidence level, whether the electronic document satisfies a set of signature criteria.

Embodiment 15. The system of embodiment 14, wherein the one or more signature-extraction models comprise a first signature-extraction model configured to recognize signatures regardless of spatial location.

Embodiment 16. The system of embodiment 14-15, wherein the one or more signature-extraction models comprise a second signature-extraction model configured to recognize signatures based on in-document spatial location.

Embodiment 17. The system of embodiment 16, wherein applying the second signature-extraction model comprises:
- determining a predicted spatial location within the electronic document based on one or more of a structure, format, and type of the electronic document; and
- extracting a signature from the predicted spatial location.

Embodiment 18. The system of embodiment 14-17, wherein determining whether the electronic document satisfies the set of signature criteria comprises determining whether a signature appears in the electronic document at a required spatial location.

Embodiment 19. The system of embodiment 14-18, wherein determining whether the electronic document satisfies the set of signature criteria comprises determining whether the confidence level exceeds a predefined threshold.

Embodiment 20. The system of embodiment 14-19, wherein determining whether the electronic document satisfies the set of signature criteria comprises determining whether a signature appears in the electronic document within a required spatial proximity to a component extracted from the document.

Embodiment 21. The system of embodiment 14-20, wherein determining whether the electronic document satisfies the set of signature criteria comprises generating an association score indicting a level of association between a signature extracted from the electronic document and signature-context data generated based the electronic document.

Embodiment 22. The system of embodiment 14-21, wherein the system is configured to determine the set of signature criteria based at least in part on context data, wherein the context data indicates one or more of: document type, document structure, and document format.

Embodiment 23. The system of embodiment 14-22, wherein the system is configured to determine the set of signature criteria based at least in part on the one or more signatures detected in the document.

Embodiment 24. A non-transitory computer-readable storage medium storing instructions for validating signatures in documents, the instructions configured to be executed by a one or more processors of a system to cause the system to:

receive an electronic document comprising one or more signatures;

apply one or more signature-extraction models to the electronic document to generate, for each of the one or more signatures in the electronic document, data representing a spatial location for the respective signature and a confidence level for the respective signature; and determine, based on the data representing the spatial location and the confidence level, whether the electronic document satisfies a set of signature criteria.

Embodiment 25. A method for validating signatures in documents, wherein the method is performed by a system comprising one or more processors, the method comprising:

receiving an electronic document comprising one or more signatures;

applying one or more signature-extraction models to the electronic document to generate, for each of the one or more signatures in the electronic document, data representing a spatial location for the respective signature and a confidence level for the respective signature; and determining, based on the data representing the spatial location and the confidence level, whether the electronic document satisfies a set of signature criteria.

Embodiment 26. A system for extracting information from documents, the system comprising one or more processors configured to cause the system to:

receive a data set comprising a plurality of electronic documents;

apply a set of data conversion processing steps to the plurality of electronic documents to generate a processed data set comprising structured data generated based on the plurality of electronic documents, wherein applying set of data conversion processing steps comprises applying one or more deep-learning-based optical character recognition (OCR) models; and apply a set of knowledge-based modeling processing steps to the structured data, wherein applying the set of knowledge-based modeling processing steps comprises:

applying a knowledge-based deep learning model trained based on the structured data and a plurality of data labels indicated by one or more user inputs; and generating output data extracted from the plurality of electronic documents by the deep learning model.

Embodiment 27. The system of embodiment 26, wherein applying the set of data conversion processing steps comprises, before applying the one or more deep-learning-based OCR models, applying an automated orientation correction processing step.

Embodiment 28. The system of embodiment 26-27, wherein applying the set of data conversion processing steps comprises, before applying the one or more deep-learning-based OCR models, applying a denoising function.

Embodiment 29. The system of embodiment 26-28, wherein applying the one or more deep-learning-based OCR models comprises:

applying a text-detection model; and applying a text-recognition model.

Embodiment 30. The system of embodiment 26-29, wherein applying the set of data conversion processing steps comprises, after applying the one or more deep-learning-based OCR models, generating the structured data based on an image-level feature engineering step.

Embodiment 31. The system of embodiment 26-30, wherein applying the set of data conversion processing steps comprises applying a post-processing method that uses morphology to parse structural relationships amongst words.

Embodiment 32. The system of embodiment 26-31, wherein applying the set of knowledge-based modeling processing steps comprises, before receiving the user input indicating the plurality of data labels, generating the structured data based on one or more feature engineering processing steps.

Embodiment 33. The system of embodiment 32, wherein the one or more feature engineering processing steps comprise predicting word groups based on morphology.

Embodiment 34. The system of embodiment 26-33, wherein applying the set of knowledge-based modeling processing steps comprises applying a model trained based on user used for user-defined feature engineering.

Embodiment 35. The system of embodiment 26-34, wherein applying the set of knowledge-based modeling processing steps comprises applying fuzzy matching, wherein the system is configured to consider a partial match sufficient for labeling purposes, to automatically label documents on a word-by-word basis.

Embodiment 36. The system of embodiment 26-35, wherein applying the set of knowledge-based modeling processing steps comprises automatically correcting one or more text-recognition errors during a training process.

Embodiment 37. The system of embodiment 26-36, wherein the knowledge-based deep learning model comprises a loss function that is configured to accelerate convergence of the knowledge-based deep learning model.

Embodiment 38. The system of embodiment 26-37, wherein the knowledge-based deep learning model comprises one or more layers using natural language processing (NLP) embedding such that the model learns both content information and related location information Embodiment 39. The system of embodiment 26-38, wherein the knowledge-based deep learning model is trained using an adaptive feeding method.

Embodiment 40. The system of embodiment 26-39, wherein the knowledge-based deep learning model comprises an input layer that applies merged embedding.

Embodiment 41. The system of embodiment 26-40, wherein the knowledge-based deep learning model comprises an input layer that is configured for variant batch sizes.

Embodiment 42. The system of embodiment 26-41, wherein the knowledge-based deep learning model comprises an input layer that applies a sliding window.

Embodiment 43. The system of embodiment 26-42, wherein the knowledge-based deep learning model comprises one or more fully-dense layers disposed between an input layer and a prediction layer.

Embodiment 44. The system of embodiment 26-43, wherein the knowledge-based deep learning model comprises a prediction layer that generates one or more metrics for presentation to a user.

Embodiment 45. A non-transitory computer-readable storage medium storing instructions for extracting information from documents, the instructions configured to be executed by one or more processors of a system to cause the system to:

- receive a data set comprising a plurality of electronic documents;
- apply a set of data conversion processing steps to the plurality of electronic documents to generate a processed data set comprising structured data generated based on the plurality of electronic documents, wherein applying set of data conversion processing steps comprises applying one or more deep-learning-based optical character recognition (OCR) models; and
- apply a set of knowledge-based modeling processing steps to the structured data, wherein applying the set of knowledge-based modeling processing steps comprises:
  - applying a knowledge-based deep learning model trained based on the structured data and a plurality of data labels indicated by one or more user inputs; and
  - generating output data extracted from the plurality of electronic documents by the deep learning model.

Embodiment 46. A method for extracting information from documents, wherein the method is executed by a system comprising one or more processors, the method comprising:

- receiving a data set comprising a plurality of electronic documents;
- applying a set of data conversion processing steps to the plurality of electronic documents to generate a processed data set comprising structured data generated based on the plurality of electronic documents, wherein applying set of data conversion processing steps comprises applying one or more deep-learning-based optical character recognition (OCR) models; and
- applying a set of knowledge-based modeling processing steps to the structured data, wherein applying the set of knowledge-based modeling processing steps comprises:
  - applying a knowledge-based deep learning model trained based on the structured data and a plurality of data labels indicated by one or more user inputs; and
  - generating output data extracted from the plurality of electronic documents by the deep learning model.

This application incorporates by reference the entire contents of U.S. patent application Ser. No. 17/854,329, filed Jun. 30, 2022, titled "AI-AUGMENTED AUDITING PLATFORM INCLUDING TECHNIQUES FOR AUTOMATED ASSESSMENT OF VOUCHING EVIDENCE"

This application incorporates by reference the entire contents of U.S. patent application Ser. No. 17/854,337, filed Jun. 30, 2022, titled "AI-AUGMENTED AUDITING PLATFORM INCLUDING TECHNIQUES FOR AUTOMATED ADJUDICATION OF COMMERCIAL SUBSTANCE, RELATED PARTIES, AND COLLECTABILITY".

This application incorporates by reference the entire contents of U.S. patent application Ser. No. 17/854,338, filed Jun. 30, 2022, titled "AI-AUGMENTED AUDITING PLATFORM INCLUDING TECHNIQUES FOR APPLYING A COMPOSABLE ASSURANCE INTEGRITY FRAMEWORK".

This application incorporates by reference the entire contents of U.S. patent application Ser. No. 17/854,352, filed Jun. 30, 2022, titled "AI-AUGMENTED AUDITING PLATFORM INCLUDING TECHNIQUES FOR PROVIDING AI-EXPLAINABILITY FOR PROCESSING DATA THROUGH MULTIPLE LAYERS".

The invention claimed is:

1. A system for validating signatures in documents, the system comprising one or more processors configured to cause the system to:

- receive an electronic document comprising one or more signatures;
- process the electronic document to generate a set of signature criteria for the received electronic document:
- apply one or more signature-extraction models to the electronic document to generate, for each of the one or more signatures in the electronic document, data representing a spatial location for the respective signature and a confidence level for the respective signature; and
- determine, based on the data representing the spatial location and the confidence level, whether the electronic document satisfies the set of signature criteria.

2. The system of claim 1, wherein the one or more signature-extraction models comprise a first signature-extraction model configured to recognize signatures regardless of spatial location.

3. The system of claim 1, wherein the one or more signature-extraction models comprise a second signature-extraction model configured to recognize signatures based on in-document spatial location.

4. The system of claim 3, wherein applying the second signature- extraction model comprises:

determining a predicted spatial location within the electronic document based on one or more of a structure, format, and type of the electronic document; and extracting a signature from the predicted spatial location.

5. The system of claim 1, wherein determining whether the electronic document satisfies the set of signature criteria comprises determining whether a signature appears in the electronic document at a required spatial location.

6. The system of claim 1, wherein determining whether the electronic document satisfies the set of signature criteria comprises determining whether the confidence level exceeds a predefined threshold.

7. The system of claim 1, wherein determining whether the electronic document satisfies the set of signature criteria comprises determining whether a signature appears in the electronic document within a required spatial proximity to a component extracted from the document.

8. The system of claim 1, wherein determining whether the electronic document satisfies the set of signature criteria comprises generating an association score indicting a level of association between a signature extracted from the electronic document and signature-context data generated based on the electronic document.

9. The system of claim 1, wherein the system is configured to determine the set of signature criteria based at least in part on context data, wherein the context data indicates one or more of: document type, document structure, and document format.

10. The system of claim 1, wherein the system is configured to determine the set of signature criteria based at least in part on the one or more signatures detected in the document.

11. A non-transitory computer-readable storage medium storing instructions for validating signatures in documents, the instructions configured to be executed by a one or more processors of a system to cause the system to:

receive an electronic document comprising one or more signatures;

process the electronic document to generate a set of signature criteria for the received electronic document:

apply one or more signature-extraction models to the electronic document to generate, for each of the one or more signatures in the electronic document, data representing a spatial location for the respective signature and a confidence level for the respective signature; and determine, based on the data representing the spatial location and the confidence level, whether the electronic document satisfies the set of signature criteria.

12. A method for validating signatures in documents, wherein the method is performed by a system comprising one or more processors, the method comprising:

receiving an electronic document comprising one or more signatures;

processing the electronic document to generate a set of signature criteria for the received electronic document;

applying one or more signature-extraction models to the electronic document to generate, for each of the one or more signatures in the electronic document, data representing a spatial location for the respective signature and a confidence level for the respective signature; and determining, based on the data representing the spatial location and the confidence level, whether the electronic document satisfies the set of signature criteria.

13. A system for extracting information from documents, the system comprising one or more processors configured to cause the system to:

receive a first data set comprising a first plurality of electronic documents;

apply a set of data conversion processing steps to the first plurality of electronic documents to generate a first processed data set comprising first structured data generated based on the first plurality of electronic documents, wherein applying the set of data conversion processing steps comprises applying one or more deep-learning-based optical character recognition (OCR) models;

train a knowledge-based deep learning model trained based on the first structured data and a first plurality of data labels indicated by one or more user inputs;

receive a second data set comprising a second plurality of electronic documents;

apply the set of data conversion processing steps to the second plurality of electronic documents to generate a second processed data set comprising second structured data generated based on the second plurality of electronic documents, wherein applying set of data conversion processing steps comprises applying one or more deep-learning-based optical character recognition (OCR) models; and apply a set of knowledge-based modeling processing steps to the second structured data, wherein applying the set of knowledge-based modeling processing steps comprises:

applying the knowledge-based deep learning model to the second structured data; and generating output data extracted from the second plurality of electronic documents by the deep learning model.

14. The system of claim 13, wherein applying the set of data conversion processing steps comprises, before applying the one or more deep-learning-based OCR models, applying an automated orientation correction processing step.

15. The system of claim 13, wherein applying the set of data conversion processing steps comprises, before applying the one or more deep-learning-based OCR models, applying a denoising function.

16. The system of claim 13, wherein applying the one or more deep-learning-based OCR models comprises:

applying a text-detection model; and applying a text-recognition model.

17. The system of claim 13, wherein applying the set of data conversion processing steps comprises, after applying the one or more deep-learning-based OCR models, generating the structured data based on an image-level feature engineering step.

18. The system of claim 13, wherein applying the set of data conversion processing steps comprises applying a post-processing method that uses morphology to parse structural relationships amongst words.

19. The system of claim 13, wherein applying the set of knowledge-based modeling processing steps comprises, before receiving the user input indicating the plurality of data labels, generating the structured data based on one or more feature engineering processing steps.

20. The system of claim 19, wherein the one or more feature engineering processing steps comprise predicting word groups based on morphology.

21. The system of claim 13, wherein applying the set of knowledge-based modeling processing steps comprises applying a model trained based on user used for user-defined feature engineering.

22. The system of claim 13, wherein applying the set of knowledge-based modeling processing steps comprises applying fuzzy matching, wherein the system is configured to consider a partial match sufficient for labeling purposes, to automatically label documents on a word-by-word basis.

23. The system of claim 13, wherein applying the set of knowledge-based modeling processing steps comprises automatically correcting one or more text-recognition errors during a training process.

24. The system of claim 13, wherein the knowledge-based deep learning model comprises a loss function that is configured to accelerate convergence of the knowledge-based deep learning model.

25. The system of claim 13, wherein the knowledge-based deep learning model comprises one or more layers using natural language processing (NLP) embedding such that the model learns both content information and related location information.

26. The system of claim 13, wherein the knowledge-based deep learning model is trained using an adaptive feeding method.

27. The system of claim 13, wherein the knowledge-based deep learning model comprises an input layer that applies merged embedding.

28. The system of claim 13, wherein the knowledge-based deep learning model comprises an input layer that is configured for variant batch sizes.

29. The system of claim 13, wherein the knowledge-based deep learning model comprises an input layer that applies a sliding window.

30. The system of claim 13, wherein the knowledge-based deep learning model comprises one or more fully-dense layers disposed between an input layer and a prediction layer.

31. The system of claim 13, wherein the knowledge-based deep learning model comprises a prediction layer that generates one or more metrics for presentation to a user.

32. A non-transitory computer-readable storage medium storing instructions for extracting information from documents, the instructions configured to be executed by one or more processors of a system to cause the system to:

receive a first data set comprising a first plurality of electronic documents;

apply a set of data conversion processing steps to the first plurality of electronic documents to generate a first processed data set comprising first structured data generated based on the first plurality of electronic documents, wherein applying the set of data conversion processing steps comprises applying one or more deep-learning-based optical character recognition (OCR) models;

train a knowledge-based deep learning model trained based on the first structured data and a first plurality of data labels indicated by one or more user inputs;

receive a second data set comprising a second plurality of electronic documents;

apply the set of data conversion processing steps to the second plurality of electronic documents to generate a second processed data set comprising second structured data generated based on the second plurality of electronic documents, wherein applying set of data conversion processing steps comprises applying one or more deep-learning-based optical character recognition (OCR) models; and apply a set of knowledge-based modeling processing steps to the second structured data, wherein applying the set of knowledge-based modeling processing steps comprises:

applying the knowledge-based deep learning model to the second structured data; and generating output data extracted from the second plurality of electronic documents by the deep learning model.

33. A method for extracting information from documents, wherein the method is executed by a system comprising one or more processors, the method comprising:

receiving a first data set comprising a first plurality of electronic documents;

applying a set of data conversion processing steps to the first plurality of electronic documents to generate a first processed data set comprising first structured data generated based on the first plurality of electronic documents, wherein applying set of data conversion processing steps comprises applying one or more deep-learning-based optical character recognition (OCR) models;

training a knowledge-based deep learning model trained based on the first structured data and a first plurality of data labels indicated by one or more user inputs;

receiving a second data set comprising a second plurality of electronic documents;

applying the set of data conversion processing steps to the second plurality of electronic documents to generate a second processed data set comprising second structured data generated based on the second plurality of electronic documents, wherein applying set of data conversion processing steps comprises applying one or more deep-learning-based optical character recognition (OCR) models; and applying a set of knowledge-based modeling processing steps to the second structured data, wherein applying the set of knowledge-based modeling processing steps comprises:

applying the knowledge-based deep learning model to the second structured data; and generating output data extracted from the second plurality of electronic documents by the deep learning model.

* * * * *